US012614393B2

(12) United States Patent
Kono et al.

(10) Patent No.: US 12,614,393 B2
(45) Date of Patent: Apr. 28, 2026

(54) OBJECT DETECTION DEVICE, OBJECT DETECTION SYSTEM, MOBILE OBJECT, AND OBJECT DETECTION METHOD

(71) Applicant: KYOCERA Corporation, Kyoto (JP)

(72) Inventors: Kenji Kono, Yokohama (JP); Fuko Takano, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 489 days.

(21) Appl. No.: 17/754,083

(22) PCT Filed: Sep. 16, 2020

(86) PCT No.: PCT/JP2020/035140
§ 371 (c)(1),
(2) Date: Mar. 23, 2022

(87) PCT Pub. No.: WO2021/060117
PCT Pub. Date: Apr. 1, 2021

(65) Prior Publication Data
US 2022/0415057 A1 Dec. 29, 2022

(30) Foreign Application Priority Data

Sep. 24, 2019 (JP) ................................. 2019-173341

(51) Int. Cl.
*G06V 20/58* (2022.01)
*G06T 7/60* (2017.01)
(Continued)

(52) U.S. Cl.
CPC ................ *G06V 20/58* (2022.01); *G06T 7/60* (2013.01); *G06T 7/70* (2017.01); *G06V 10/12* (2022.01);
(Continued)

(58) Field of Classification Search
CPC ...... G06V 20/58; G06V 10/12; G06V 20/588; G06T 7/60; G06T 7/70;
(Continued)

(56) References Cited

U.S. PATENT DOCUMENTS 5,410,346 A    4/1995  Saneyoshi et al.
10,635,110 B2 *  4/2020  Shashua ................. G01C 21/32
(Continued)

FOREIGN PATENT DOCUMENTS

JP    H05-265547 A    10/1993
JP    2016-206801 A    12/2016
(Continued)

OTHER PUBLICATIONS

"Chung-Hee Lee et al., Stereo Vision-Based Obstacle Detection Using Dense Disparity Map, Oct. 1, 2011, International Conference on Graphic and Image Processing ICGIP 2011, Proceedings vol. 8285, pp. 1-6" (Year: 2011).*
(Continued)

*Primary Examiner* — Andrew W Bee
*Assistant Examiner* — D J Dhooge
(74) *Attorney, Agent, or Firm* — Studebaker Brackett PLLC

(57) ABSTRACT

An object detection device is configured to execute a road surface detection process, an object disparity determination process, and an object detection process. The road surface detection process estimates a position of a road surface on the basis of a first disparity map. The first disparity map is generated on the basis of an output of a stereo camera and is a map in which a disparity is associated with two-dimensional coordinates formed by a first direction corresponding to a horizontal direction of an image captured by the stereo camera and a second direction intersecting the first direction. The object disparity determination process deter-
(Continued)

mines disparities as object disparities when the number of occurrences of each of the disparities for respective coordinate ranges in the first direction of the first disparity map exceeds a predetermined threshold corresponding to the disparity. The object detection process detects an object by converting information on the object disparities into points on an x-z coordinate space and by extracting a group of points.

10 Claims, 31 Drawing Sheets

(51) Int. Cl.

| | |
|---|---|
| *G06T 7/70* | (2017.01) |
| *G06V 10/12* | (2022.01) |
| *G06V 20/56* | (2022.01) |
| *H04N 13/239* | (2018.01) |
| *H04N 13/271* | (2018.01) |

(52) U.S. Cl.
CPC ......... *G06V 20/588* (2022.01); *H04N 13/239* (2018.05); *H04N 13/271* (2018.05); *G06T 2207/10012* (2013.01); *G06T 2207/30252* (2013.01)

(58) Field of Classification Search
CPC . G06T 2207/10012; G06T 2207/30252; G06T 2207/30261; G06T 7/593; G06T 7/0002; H04N 13/239; H04N 13/271; G08G 1/09623; G08G 1/166
See application file for complete search history.

(56) References Cited

U.S. PATENT DOCUMENTS

| | | | | |
|---|---|---|---|---|
| 10,755,116 | B2 * | 8/2020 | Nakata | G08G 1/166 |
| 11,397,433 | B2 * | 7/2022 | Shashua | B60W 60/0015 |
| 2014/0086477 | A1 * | 3/2014 | You | G06T 7/50 |
| | | | | 382/154 |
| 2016/0253575 | A1 | 9/2016 | Kakegawa et al. | |
| 2017/0010108 | A1 * | 1/2017 | Shashua | G05D 1/0287 |
| 2018/0225838 | A1 * | 8/2018 | Ohara | G01C 3/14 |
| 2018/0268229 | A1 | 9/2018 | Nakata et al. | |
| 2019/0347821 | A1 * | 11/2019 | Stein | G06V 20/588 |

FOREIGN PATENT DOCUMENTS

| | | | |
|---|---|---|---|
| JP | 2018-092605 | A | 6/2018 |
| WO | 2017/090326 | A1 | 6/2017 |

OTHER PUBLICATIONS

"John Lambert, Stereo and Disparity, Dec. 27, 2018, John Lambert GitHub, Post/Edition from Dec. 27, 2018, pp. 1-6" ( Year: 2018).*

Chung-Hee Lee et al., "Stereo vision-based vehicle detection using a road feature and disparity histogram", Optical Engineering, vol. 50, No. 2, Feb. 22, 2011, pp. 027004-1 to 027004-23, doi: 10.1117/1.3535590.

Sebastien Kramm et al., "Obstacle detection using sparse stereovision and clustering techniques", 2012 Intelligent Vehicles Symposium, Alcala de Henares, Spain, Jun. 3-7, 2012, pp. 760-765, IEEE, doi: 10.1109/IVS.2012.6232283.

* cited by examiner

Figure 7:
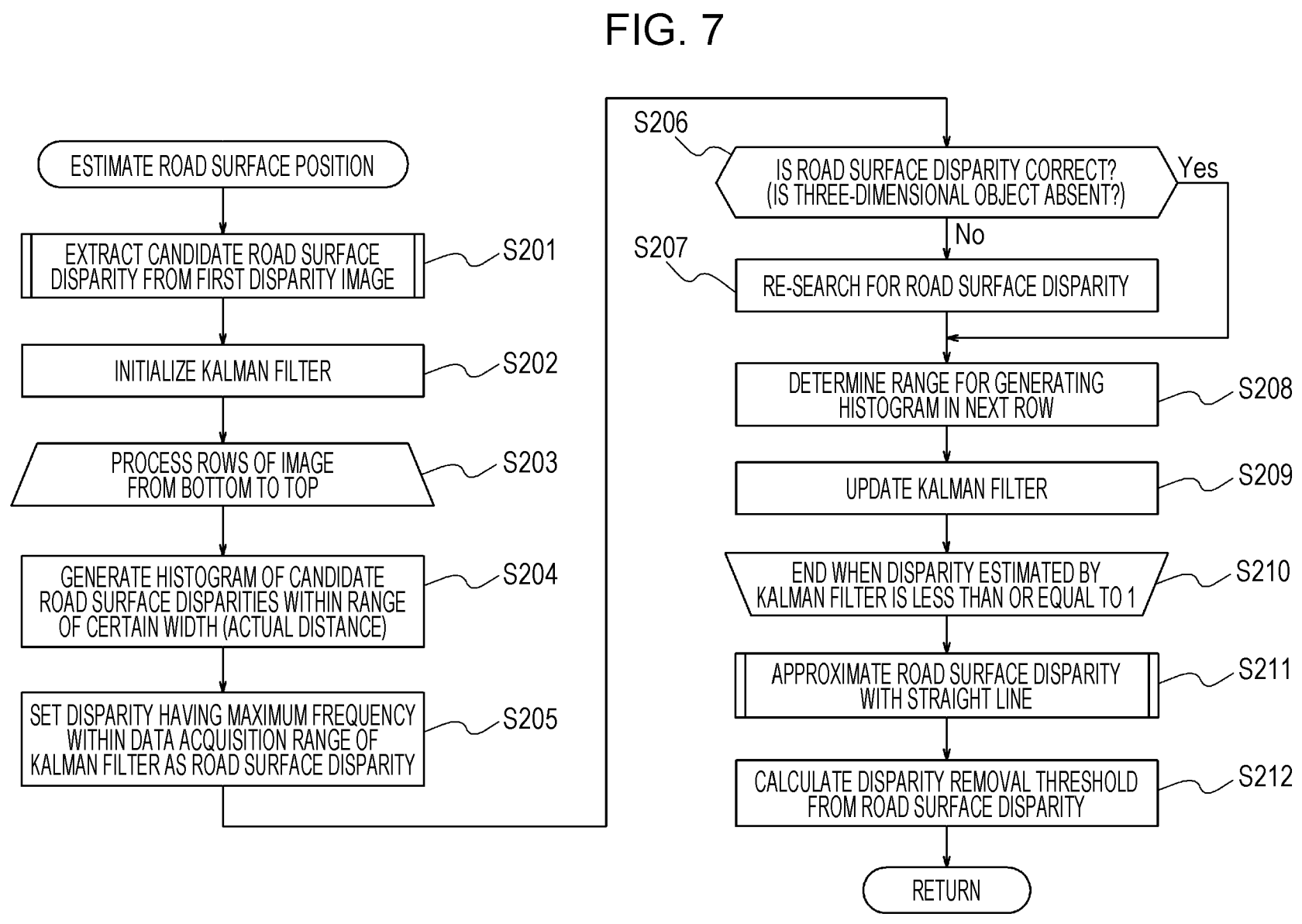

ESTIMATE ROAD SURFACE POSITION

EXTRACT CANDIDATE ROAD SURFACE DISPARITY FROM FIRST DISPARITY IMAGE — S201

INITIALIZE KALMAN FILTER — S202

PROCESS ROWS OF IMAGE FROM BOTTOM TO TOP — S203

GENERATE HISTOGRAM OF CANDIDATE ROAD SURFACE DISPARITIES WITHIN RANGE OF CERTAIN WIDTH (ACTUAL DISTANCE) — S204

SET DISPARITY HAVING MAXIMUM FREQUENCY WITHIN DATA ACQUISITION RANGE OF KALMAN FILTER AS ROAD SURFACE DISPARITY — S205

IS ROAD SURFACE DISPARITY CORRECT? (IS THREE-DIMENSIONAL OBJECT ABSENT?) — S206

Yes

No

RE-SEARCH FOR ROAD SURFACE DISPARITY — S207

DETERMINE RANGE FOR GENERATING HISTOGRAM IN NEXT ROW — S208

UPDATE KALMAN FILTER — S209

END WHEN DISPARITY ESTIMATED BY KALMAN FILTER IS LESS THAN OR EQUAL TO 1 — S210

APPROXIMATE ROAD SURFACE DISPARITY WITH STRAIGHT LINE — S211

CALCULATE DISPARITY REMOVAL THRESHOLD FROM ROAD SURFACE DISPARITY — S212

RETURN

FIG. 8

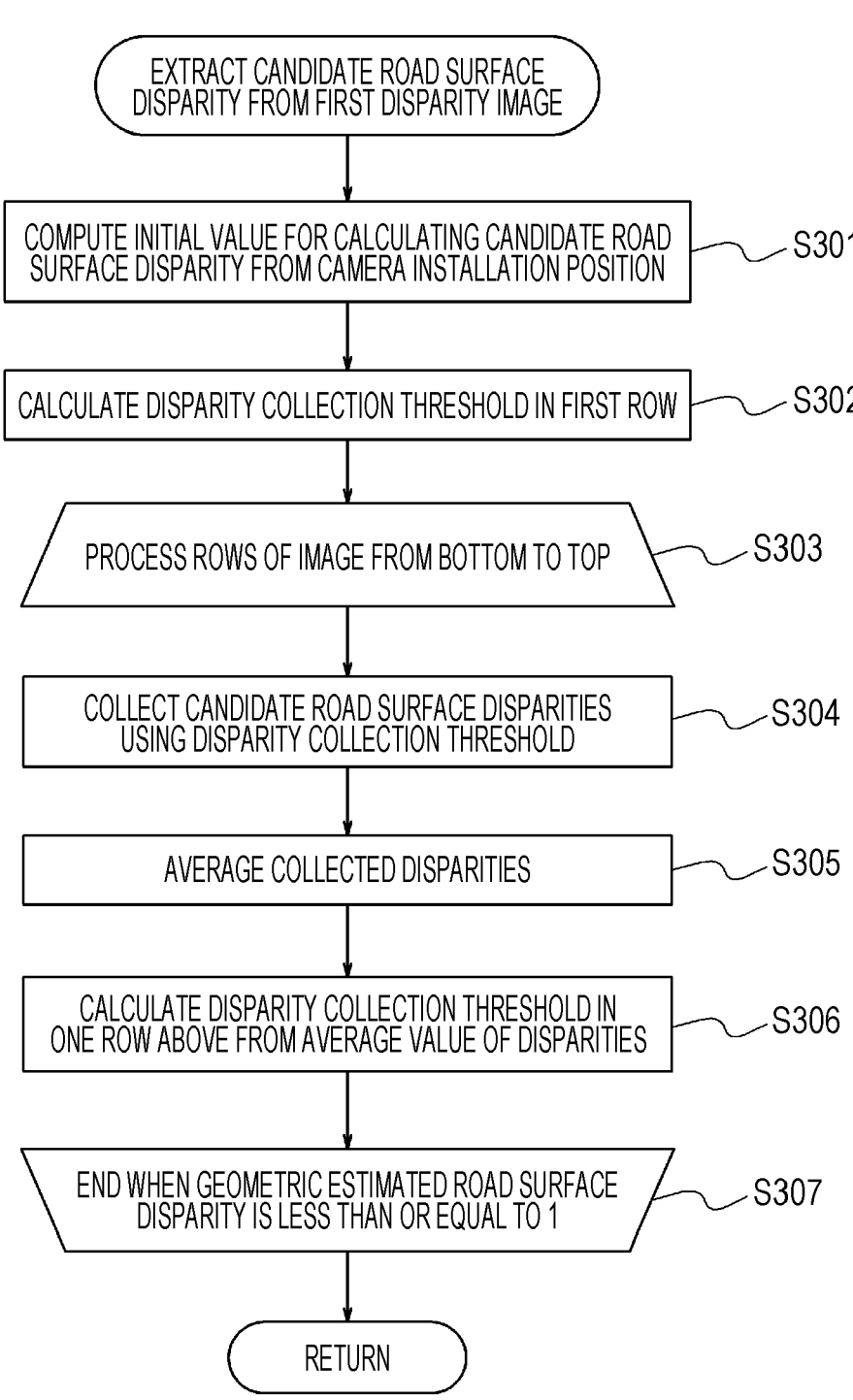

EXTRACT CANDIDATE ROAD SURFACE
DISPARITY FROM FIRST DISPARITY IMAGE

COMPUTE INITIAL VALUE FOR CALCULATING CANDIDATE ROAD
SURFACE DISPARITY FROM CAMERA INSTALLATION POSITION — S301

CALCULATE DISPARITY COLLECTION THRESHOLD IN FIRST ROW — S302

PROCESS ROWS OF IMAGE FROM BOTTOM TO TOP — S303

COLLECT CANDIDATE ROAD SURFACE DISPARITIES
USING DISPARITY COLLECTION THRESHOLD — S304

AVERAGE COLLECTED DISPARITIES — S305

CALCULATE DISPARITY COLLECTION THRESHOLD IN
ONE ROW ABOVE FROM AVERAGE VALUE OF DISPARITIES — S306

END WHEN GEOMETRIC ESTIMATED ROAD SURFACE
DISPARITY IS LESS THAN OR EQUAL TO 1 — S307

RETURN

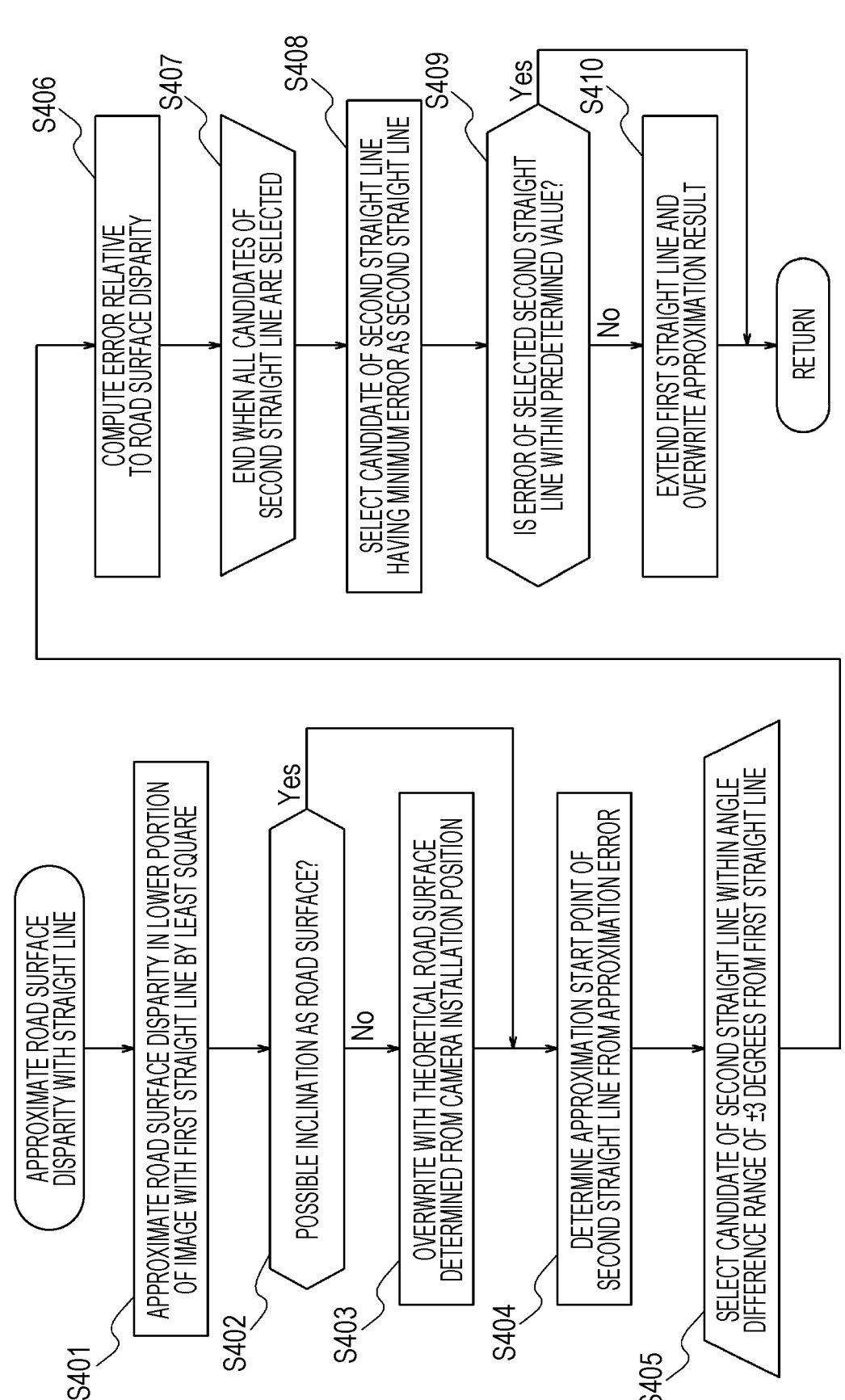

S401  APPROXIMATE ROAD SURFACE DISPARITY WITH STRAIGHT LINE

S402  APPROXIMATE ROAD SURFACE DISPARITY IN LOWER PORTION OF IMAGE WITH FIRST STRAIGHT LINE BY LEAST SQUARE

S403  POSSIBLE INCLINATION AS ROAD SURFACE?

Yes

No

S404  OVERWRITE WITH THEORETICAL ROAD SURFACE DETERMINED FROM CAMERA INSTALLATION POSITION

DETERMINE APPROXIMATION START POINT OF SECOND STRAIGHT LINE FROM APPROXIMATION ERROR

S405  SELECT CANDIDATE OF SECOND STRAIGHT LINE WITHIN ANGLE DIFFERENCE RANGE OF ±3 DEGREES FROM FIRST STRAIGHT LINE

S406  COMPUTE ERROR RELATIVE TO ROAD SURFACE DISPARITY

S407  END WHEN ALL CANDIDATES OF SECOND STRAIGHT LINE ARE SELECTED

S408  SELECT CANDIDATE OF SECOND STRAIGHT LINE HAVING MINIMUM ERROR AS SECOND STRAIGHT LINE

S409  IS ERROR OF SELECTED SECOND STRAIGHT LINE WITHIN PREDETERMINED VALUE?

Yes

No

S410  EXTEND FIRST STRAIGHT LINE AND OVERWRITE APPROXIMATION RESULT

RETURN

FIG. 19

FIG. 20

WINDOW SIZE = 3 i OR MORE CELLS

FIG. 33

OBJECT DETECTION DEVICE, OBJECT DETECTION SYSTEM, MOBILE OBJECT, AND OBJECT DETECTION METHOD

CROSS REFERENCE TO RELATED APPLICATIONS

The present application claims priority to Japanese Patent Application No. 2019-173341 filed in Japan on Sep. 24, 2019, the entire disclosure of which is incorporated herein by reference.

TECHNICAL FIELD

The present disclosure relates to an object detection device, an object detection system, a mobile object, and an object detection method.

BACKGROUND ART

A recent mobile object such as an automobile is provided with an object detection device including a stereo camera, and the object detection device is used for object detection, distance measurement, and the like. Such an object detection device determines a distance distribution (or a disparity distribution) over an entire image from a plurality of images acquired from a plurality of cameras and detects an obstacle from information on the distance distribution (for example, see PTL 1).

CITATION LIST

Patent Literature

PTL 1: Japanese Unexamined Patent Application Publication No. 5-265547

SUMMARY OF INVENTION

An object detection device of the present disclosure includes a processor configured to execute a road surface detection process, an object disparity determination process, and an object detection process. The road surface detection process estimates a position of a road surface in a real space on the basis of a first disparity map. The first disparity map is generated on the basis of an output of a stereo camera that captures an image including the road surface. In the first disparity map, a disparity obtained from the output of the stereo camera is associated with two-dimensional coordinates formed by a first direction corresponding to a horizontal direction of the image captured by the stereo camera and a second direction intersecting the first direction. The object disparity determination process determines disparities as object disparities when the number of occurrences of each of the disparities for respective coordinate ranges in the first direction of the first disparity map exceeds a predetermined threshold corresponding to the disparity. The object detection process detects an object by converting information on the object disparities into points on an x-z coordinate space of a world coordinate system, each of the points indicating presence or absence of the object, and by extracting a group of points.

An object detection system of the present disclosure includes a stereo camera that captures a plurality of images having a disparity therebetween, and an object detection device including at least one processor. The processor is configured to generate a first disparity map on the basis of an output of the stereo camera that captures an image including a road surface. In the first disparity map, a disparity obtained from the output of the stereo camera is associated with two-dimensional coordinates formed by a first direction corresponding to a horizontal direction of the image captured by the stereo camera and a second direction intersecting the first direction. The processor further executes a road surface detection process, an object disparity determination process, and an object detection process. The road surface detection process estimates a position of the road surface in a real space on the basis of the first disparity map. The object disparity determination process determines disparities as object disparities when the number of occurrences of each of the disparities for respective coordinate ranges in the first direction of the first disparity map exceeds a predetermined threshold corresponding to the disparity. The object detection process detects an object by converting information on the object disparities into points on an x-z coordinate space of a world coordinate system, each of the points indicating presence or absence of the object, and by extracting a group of points.

A mobile object of the present disclosure includes an object detection system. The object detection system includes a stereo camera that captures a plurality of images having a disparity therebetween, and an object detection device having at least one processor. The processor is configured to generate a first disparity map on the basis of an output of the stereo camera that captures an image including a road surface. In the first disparity map, a disparity obtained from the output of the stereo camera is associated with two-dimensional coordinates formed by a first direction corresponding to a horizontal direction of the image captured by the stereo camera and a second direction intersecting the first direction. The processor further executes a road surface detection process, an object disparity determination process, and an object detection process. The road surface detection process estimates a position of the road surface in a real space on the basis of the first disparity map. The object disparity determination process determines disparities as object disparities when the number of occurrences of each of the disparities for respective coordinate ranges in the first direction of the first disparity map exceeds a predetermined threshold corresponding to the disparity. The object detection process detects an object by converting information on the object disparities into points on an x-z coordinate space of a world coordinate system, each of the points indicating presence or absence of the object, and by extracting a group of points.

An object detection method of the present disclosure includes acquiring or generating a first disparity map. The first disparity map is generated on the basis of an output of a stereo camera that captures an image including a road surface. In the first disparity map, a disparity obtained from the output of the stereo camera is associated with two-dimensional coordinates formed by a first direction corresponding to a horizontal direction of the image captured by the stereo camera and a second direction intersecting the first direction. The object detection method includes executing a road surface detection process, an object disparity determination process, and an object detection process. The road surface detection process includes estimating a position of the road surface in a real space on the basis of the first disparity map. The object disparity determination process includes determining disparities as object disparities when the number of occurrences of each of the disparities for respective coordinate ranges in the first direction of the first disparity map exceeds a predetermined threshold corresponding to the disparity. The object detection process includes detecting an object by converting information on the object disparities into points on an x-z coordinate space of a world coordinate system, each of the points indicating presence or absence of the object, and by extracting a group of points.

BRIEF DESCRIPTION OF DRAWINGS

FIG. 6 is a diagram describing an example of a first disparity image acquired or generated by the object detection device.

FIG. 7 is a flowchart illustrating an example of a process for estimating a road surface position.

FIG. 8 is a flowchart illustrating an example of a process for extracting candidate road surface disparities from a first disparity image.

FIG. 9 is a diagram describing a positional relationship between the road surface and a stereo camera.

FIG. 10 is a diagram describing a procedure for extracting candidate road surface disparities.

FIG. 11 is a diagram illustrating a range on the road surface for which a histogram of disparities is generated.

FIG. 14 is a flowchart of a process for approximating a relationship between the road surface disparity $d_r$ and the coordinate in the longitudinal direction (v coordinate) of an image with straight lines.

FIG. 19 is a diagram illustrating an example of a second disparity image.

FIG. 20 is a diagram illustrating one of regions on the second disparity image from which a histogram is created.

FIG. 33 is a diagram illustrating an example of a method for outputting detection result of an object.

DESCRIPTION OF EMBODIMENTS

Figure 1:
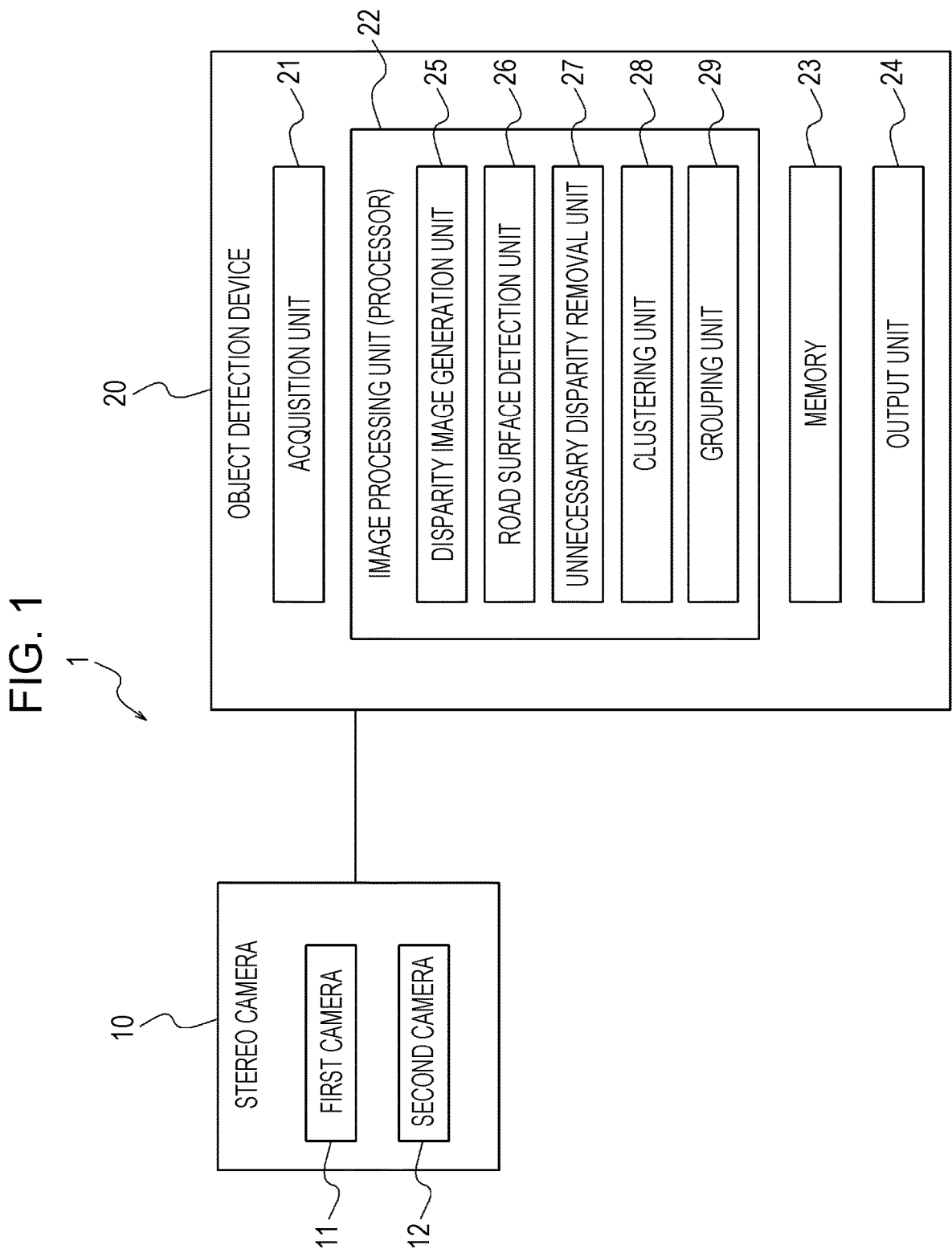
FIG. 1 is a block diagram illustrating a schematic configuration of an object detection system according to an embodiment of the present disclosure.

An object detection device may fail to achieve high performance due to various factors such as the shape of a road and structures and objects on the road. It is desirable that the object detection device have high performance. According to an aspect of the present disclosure, object detection performance can be improved.

Embodiments of the present disclosure will be described hereinafter with reference to the drawings. The drawings used in the following description are schematic ones. Dimensions, ratios, and the like in the drawings do not necessarily match the actual ones. Figures illustrating images captured by cameras, disparity images, and the like include those prepared for explanation. These images are different from images that are actually captured or processed. In the following description, a "subject" is a target whose image is to be captured by a camera. The "subject" includes an object, a road surface, the sky, and the like. An "object" has a specific position and size in a space. The "object" is also referred to as a "three-dimensional object".

As illustrated in FIG. 1, an object detection system 1 includes a stereo camera 10 and an object detection device 20. The stereo camera 10 and the object detection device 20 are capable of communicating with each other via wired or wireless communication. The stereo camera 10 and the object detection device 20 may communicate with each other via a network. The network may include, for example, a wired or wireless LAN (Local Area Network), a CAN (Controller Area Network), or the like. The stereo camera 10 and the object detection device 20 may be housed in the same housing and configured in an integrated manner. The stereo camera 10 and the object detection device 20 may be located in a mobile object 30 described below and configured to be capable of communicating with an ECU (Electronic Control Unit) in the mobile object 30.

A "stereo camera" is a plurality of cameras having parallax and cooperating with each other. The stereo camera includes at least two cameras. The stereo camera is capable of capturing an image of a target from a plurality of directions in cooperation with the plurality of cameras. The stereo camera may be a device having a single housing including a plurality of cameras. The stereo camera may be a device including two or more cameras that are independent of each other and located apart from each other. The stereo camera is not limited to a plurality of cameras independent of each other. In the present disclosure, for example, a camera having an optical mechanism that guides light incident on two separate locations to one light-receiving element can be used as a stereo camera. In the present disclosure, a plurality of images of the same subject captured from different viewpoints may be referred to as a "stereo image".

The stereo camera 10 includes a first camera 11 and a second camera 12. Each of the first camera 11 and the second camera 12 includes an optical system defining an optical axis OX, and an imaging element. The first camera 11 and the second camera 12 have different optical axes OX. In the description herein, the optical axes OX of both the first camera 11 and the second camera 12 are collectively represented by single reference sign OX. The imaging element includes a CCD image sensor (Charge-Coupled Device Image Sensor) and a CMOS image sensor (Complementary MOS Image Sensor). The imaging elements of the first camera 11 and the second camera 12 may be present in the same plane that is perpendicular to the optical axes OX of the respective cameras. The first camera 11 and the second camera 12 generate image signals representing images formed by the respective imaging elements. The first camera 11 and the second camera 12 may perform any processing, such as distortion correction, lightness adjustment, contrast adjustment, and gamma correction, on the captured images.

The optical axes OX of the first camera 11 and the second camera 12 are oriented in a direction such that the first camera 11 and the second camera 12 can capture images of the same subject. The optical axes OX and the positions of the first camera 11 and the second camera 12 are determined so that the captured images include at least the same subject. In one of a plurality of embodiments, the optical axes OX of the first camera 11 and the second camera 12 are oriented parallel to each other. The term parallel is not limited to exactly parallel, but possible errors caused by assembly and attachment and caused over time may be allowed. In another one of a plurality of embodiments, the optical axes OX of the first camera 11 and the second camera 12 are not limited to being parallel to each other, and may be oriented in directions different from each other. Even when the optical axes OX of the first camera 11 and the second camera 12 are not parallel to each other, a stereo image can be generated through conversion of the images in the stereo camera 10 or the object detection device 20. The distance between the optical centers of the first camera 11 and the second camera 12 of the stereo camera 10 is referred to as the base length. The base length corresponds to the distance between the centers of the lenses of the first camera 11 and the second camera 12. A direction connecting the optical centers of the first camera 11 and the second camera 12 of the stereo camera 10 is referred to as the base-length direction.

The first camera 11 and the second camera 12 are located apart from each other in a direction intersecting the optical axes OX. In one of a plurality of embodiments, the first camera 11 and the second camera 12 are located in the left/right direction. The first camera 11 is located to the left of the second camera 12 when facing forward. The second camera 12 is located to the right of the first camera 11 when facing forward. Due to the difference in position between the first camera 11 and the second camera 12, the corresponding positions of the subject in two images captured by the respective cameras differ. A first image output from the first camera 11 and a second image output from the second camera 12 form a stereo image captured from different viewpoints. The first camera 11 and the second camera 12 capture images of a subject at a predetermined frame rate (for example, 30 fps).

Figure 2:
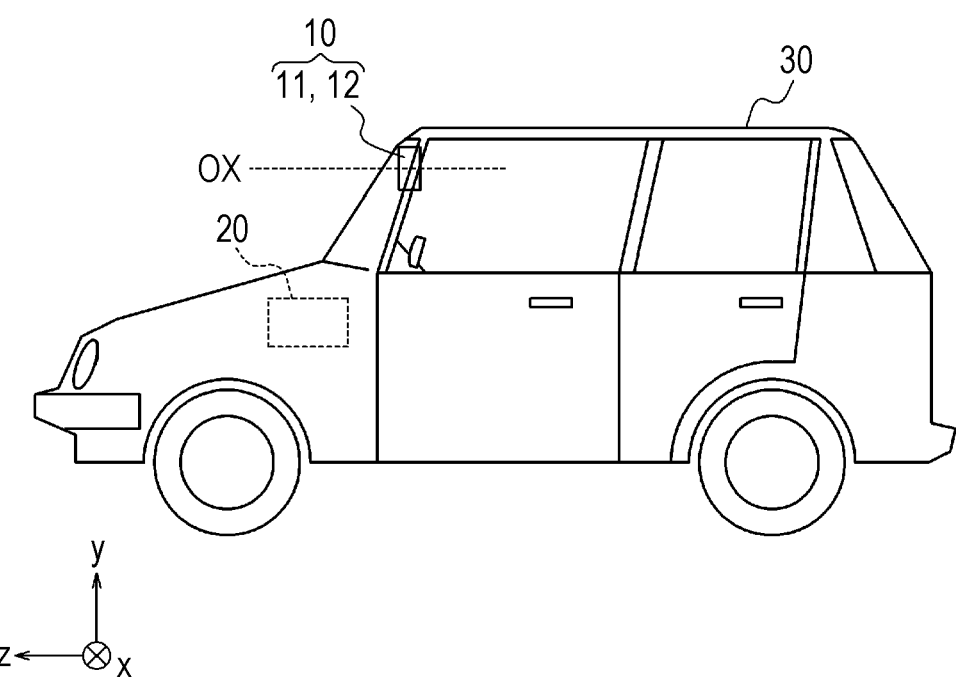
FIG. 2 is a side view schematically illustrating a mobile object having mounted therein the object detection system in FIG. 1.
Figure 3:
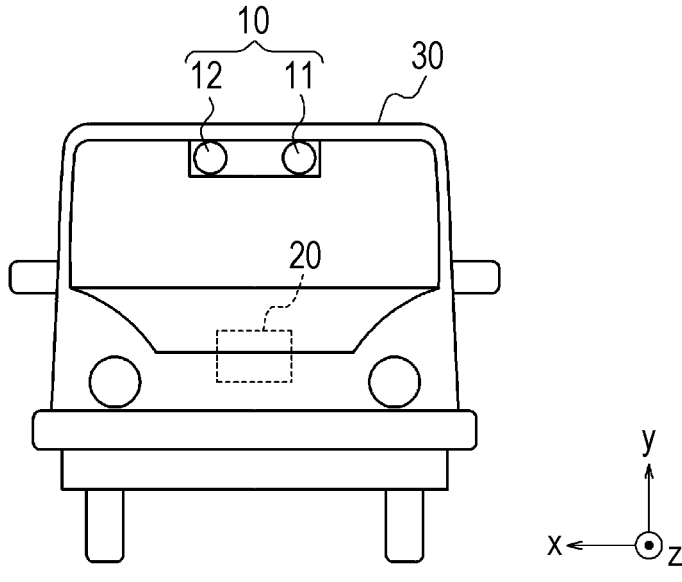
FIG. 3 is a front view schematically illustrating the mobile object having mounted therein the object detection system in FIG. 1.

As illustrated in FIG. 2 and FIG. 3, the object detection system 1 in FIG. 1 is mounted in the mobile object 30. As illustrated in a side view of FIG. 2, the first camera 11 and the second camera 12 are installed so as to capture images of a scene ahead of the mobile object 30. The first camera 11 and the second camera 12 are installed so as to capture images including a road surface. That is, the stereo camera 10 is installed so as to capture an image including a road surface. In one of a plurality of embodiments, the first camera 11 and the second camera 12 are arranged such that the optical axes OX of the respective optical systems of the first camera 11 and the second camera 12 are substantially parallel to the forward direction of the mobile object 30.

In the present application, the direction of travel of the mobile object 30 when the mobile object 30 is driving straight ahead is referred to as the forward direction or the z direction. A direction opposite to the forward direction is referred to as the backward direction. Left and right are defined with respect to the mobile object 30 that faces forward. A direction orthogonal to the z direction and pointing from left to right is referred to as the x direction. The x direction may coincide with the base-length direction. A direction perpendicular to a road surface near the mobile object 30 and pointing upward is referred to as the height direction or the y direction. The y direction may be orthogonal to the x direction and the z direction. The x direction is also referred to as the horizontal direction. The y direction is also referred to as the vertical direction. The z direction is also referred to as the depth direction.

In the present disclosure, a "mobile object" may include a vehicle and an aircraft, for example. The vehicle may include, for example, an automobile, an industrial vehicle, a railroad vehicle, a life vehicle, a fixed-wing aircraft configured to travel on a runway, and the like. The automobile may include, for example, a passenger vehicle, a truck, a bus, a two-wheeled vehicle, a trolleybus, and the like. The industrial vehicle may include, for example, industrial vehicles for agricultural and construction uses and the like. The industrial vehicle may include, for example, a forklift, a golf cart, and the like. The industrial vehicles for agricultural uses may include, for example, a tractor, a cultivator, a transplanter, a binder, a combine harvester, a lawnmower, and the like. The industrial vehicles for construction uses may include, for example, a bulldozer, a scraper, a power shovel, a crane truck, a dump truck, a road roller, and the like. The vehicle may include a human-powered vehicle. The classification of vehicles is not limited to that in the example described above. For example, the automobile may include an industrial vehicle capable of traveling on a road. A plurality of classifications may include the same vehicle. The aircraft may include, for example, a fixed-wing aircraft, a rotary-wing aircraft, and the like.

The mobile object 30 of the present disclosure travels on a travel path including a road, a runway, or the like. The surface of the travel path on which the mobile object 30 travels is referred to as a road surface.

The first camera 11 and the second camera 12 can be mounted in various locations of the mobile object 30. In one of a plurality of embodiments, the first camera 11 and the second camera 12 are mounted inside the mobile object 30, which is a vehicle, and are capable of capturing images of a scene outside the mobile object 30 through the windshield. For example, the first camera 11 and the second camera 12 are arranged ahead of the rearview mirror or on the dashboard. In one of a plurality of embodiments, the first camera 11 and the second camera 12 may be fixed to any of a front bumper, a fender grille, a side fender, a light module, and a hood of the vehicle.

The object detection device 20 includes an acquisition unit 21, an image processing unit (processor) 22, a memory 23, and an output unit 24. The object detection device 20 can be arranged at any position inside the mobile object 30. For example, the object detection device 20 can be arranged in the dashboard of the mobile object 30.

The acquisition unit 21 is an input interface of the object detection device 20 that receives an input of information from the stereo camera 10 and any other device. A physical connector and a wireless communication device can be used as the acquisition unit 21. The physical connector includes an electric connector supporting transmission via electrical signals, an optical connector supporting transmission via optical signals, and an electromagnetic connector supporting transmission via electromagnetic waves. The electric connector includes a connector conforming to IEC 60603, a connector conforming to the USB standard, a connector supporting an RCA terminal, a connector supporting an S terminal specified by EIAJ CP-1211A, a connector supporting a D terminal specified by EIAJ RC-5237, a connector conforming to the HDMI (registered trademark) standard, and a connector supporting a coaxial cable including a BNC connector. The optical connector includes various connectors conforming to IEC 61754. The wireless communication device includes wireless communication devices conforming to standards including Bluetooth (registered trademark) and IEEE 802.11. The wireless communication device includes at least one antenna.

Image data of images captured by the first camera 11 and the second camera 12 can be input to the acquisition unit 21. The acquisition unit 21 passes the input image data to the image processing unit 22. The acquisition unit 21 may support the transmission method of an imaging signal of the stereo camera 10. The acquisition unit 21 may be connected to an output interface of the stereo camera 10 via a network.

The image processing unit 22 includes one or more processors. The processors include a general-purpose processor that reads a specific program and executes a specific function, and a dedicated processor specific to a specific process. The dedicated processor includes an application specific IC (ASIC; Application Specific Integrated Circuit). The processor includes a programmable logic device (PLD). The PLD includes an FPGA (Field-Programmable Gate Array). The image processing unit 22 may be either a SoC (System-on-a-Chip) or a SiP (System In a Package) with which the one or more processors cooperate. A process to be executed by the image processing unit 22 can be translated to a process to be executed by a processor.

The image processing unit 22 includes functional blocks, namely, a disparity image generation unit 25, a road surface detection unit 26, an unnecessary disparity removal unit 27, a clustering unit 28, and a grouping unit 29. The disparity image generation unit 25 generates a first disparity image on the basis of the first image and the second image output from the stereo camera 10. The first disparity image is an image in which pixels representing disparity are arranged on a two-dimensional plane formed by a transverse direction corresponding to the horizontal direction of an image captured by the stereo camera 10, and a longitudinal direction intersecting the transverse direction. The transverse direction is a first direction.

The longitudinal direction is a second direction. The transverse direction and the longitudinal direction may be orthogonal to each other. The transverse direction corresponds to a width direction of the road surface. When the image captured by the stereo camera 10 includes the horizon, the transverse direction corresponds to a direction parallel to the horizon. The longitudinal direction may be a direction corresponding to a direction in which gravity is applied in the real space. The road surface detection unit 26, the unnecessary disparity removal unit 27, the clustering unit 28, and the grouping unit 29 execute a series of processes for detecting an object on the basis of the first disparity image.

In information processing performed in the image processing unit 22, the first disparity image undergoes various operations as a first disparity map in which disparity information obtained from the output of the stereo camera 10 is associated with two-dimensional coordinates formed by the transverse direction and the longitudinal direction. The various operations include arithmetic processing, writing and reading information to and from the memory 23, and the like. The first disparity image can be translated to a first disparity map. In the following description, a process to be performed on the first disparity image can be translated to a process to be performed on the first disparity map.

The functional blocks of the image processing unit 22 may be hardware modules or software modules. The processes performed by the functional blocks may be translated to processes executed by the image processing unit 22. The image processing unit 22 may execute all of the operations of the functional blocks. A process that the image processing unit 22 causes any of the functional blocks to perform may be executed by the image processing unit 22 itself.

The memory 23 stores programs for various processes and information being subjected to arithmetic operation. The memory 23 includes a volatile memory and a non-volatile memory. The memory 23 includes a memory independent of the processor, and an internal memory of the processor.

The output unit 24 is an output interface of the object detection device 20 that is capable of outputting a processing result of the object detection device 20 to other devices inside the mobile object 30 or devices outside the mobile object 30, such as another vehicle and a roadside device. Other devices that can appropriately use information received from the object detection device 20 include travel assistance devices such as an automatic cruise control, and safety devices such as an automatic braking device. The output unit 24 includes various interfaces supporting wired and wireless communication in a manner similar to that of the acquisition unit 21. For example, the output unit 24 has a CAN interface and communicates with other devices inside the mobile object 30.

The object detection device 20 may be configured to implement processes performed by the image processing unit 22 described below by reading a program recorded in a non-transitory computer-readable medium. The non-transitory computer-readable medium includes, but is not limited to, a magnetic storage medium, an optical storage medium, a magneto-optical storage medium, and a semiconductor storage medium. The magnetic storage medium includes a magnetic disk, a hard disk, and a magnetic tape. The optical storage medium includes optical disks such as a CD (Compact Disc), a DVD, and a Blu-ray (registered trademark) Disc. The semiconductor storage medium includes a ROM (Read Only Memory), an EEPROM (Electrically Erasable Programmable Read-Only Memory), and a flash memory.

Figure 4:
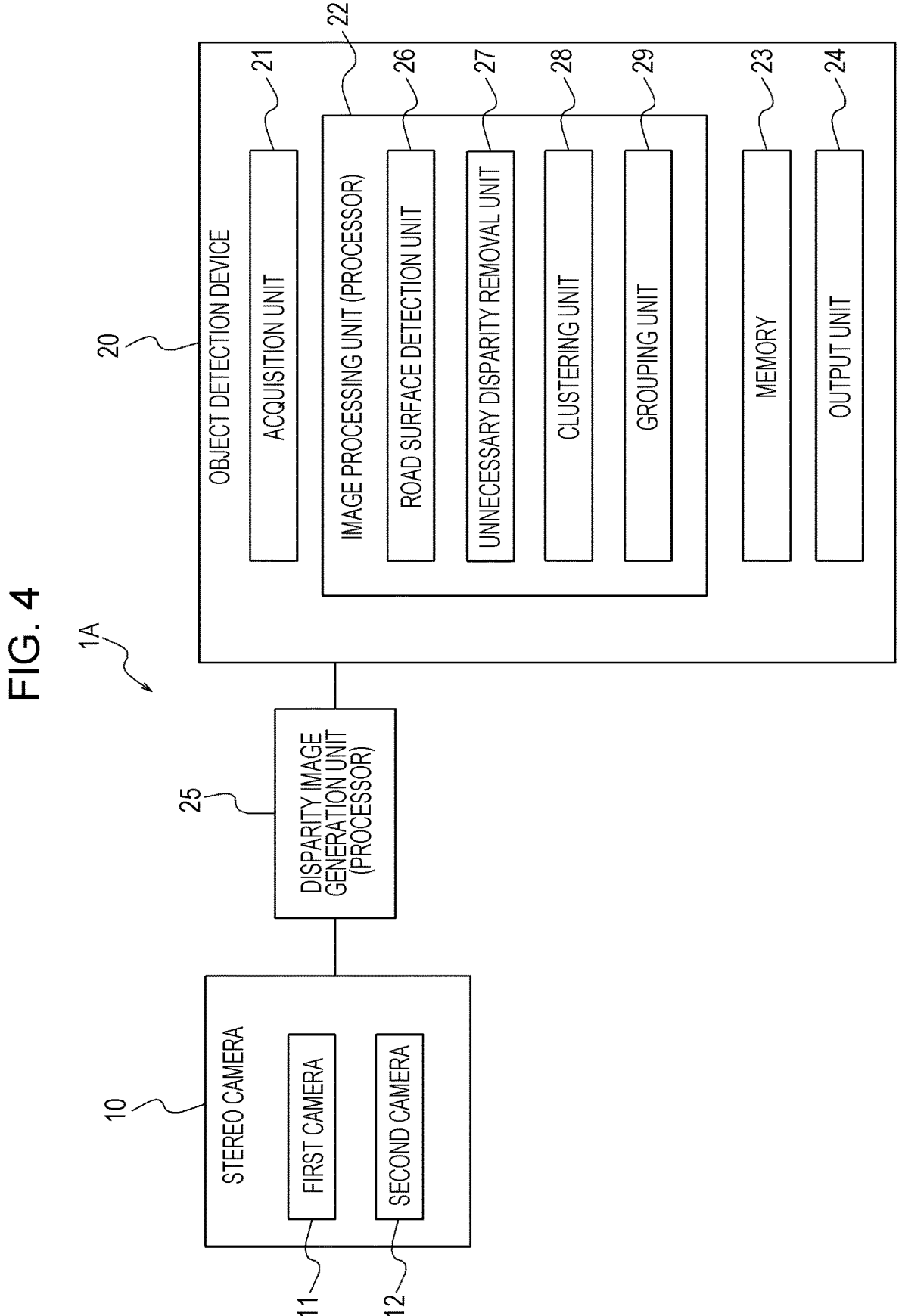
FIG. 4 is a block diagram illustrating a schematic configuration of an object detection system according to another embodiment of the present disclosure.

As illustrated in FIG. 4, in an object detection system 1A according to another embodiment of the present disclosure, the disparity image generation unit 25 may be mounted in hardware separate from the object detection device 20. In FIG. 4, the same or similar components as or to those in FIG. 1 are denoted by the same reference numerals as those in FIG. 1. The disparity image generation unit 25 in FIG. 4 can be translated to a disparity image generation device. The disparity image generation unit 25 in FIG. 4 has a processor. The processor of the disparity image generation unit 25 in FIG. 4 generates a first disparity image on the basis of the first image and the second image output from the first camera 11 and the second camera 12 of the stereo camera 10, respectively. The acquisition unit 21 included in the object detection device 20 in FIG. 4 acquires the first disparity image from the disparity image generation unit 25. The object detection device 20 and the disparity image generation unit 25 in FIG. 4 may be collectively identified as a single object detection device 20. In the object detection device 20 having the configuration in FIG. 4, the road surface detection unit 26, the unnecessary disparity removal unit 27, the clustering unit 28, and the grouping unit 29 of the image processing unit 22 function in the same manner as the corresponding functional blocks in FIG. 1.

Figure 5:
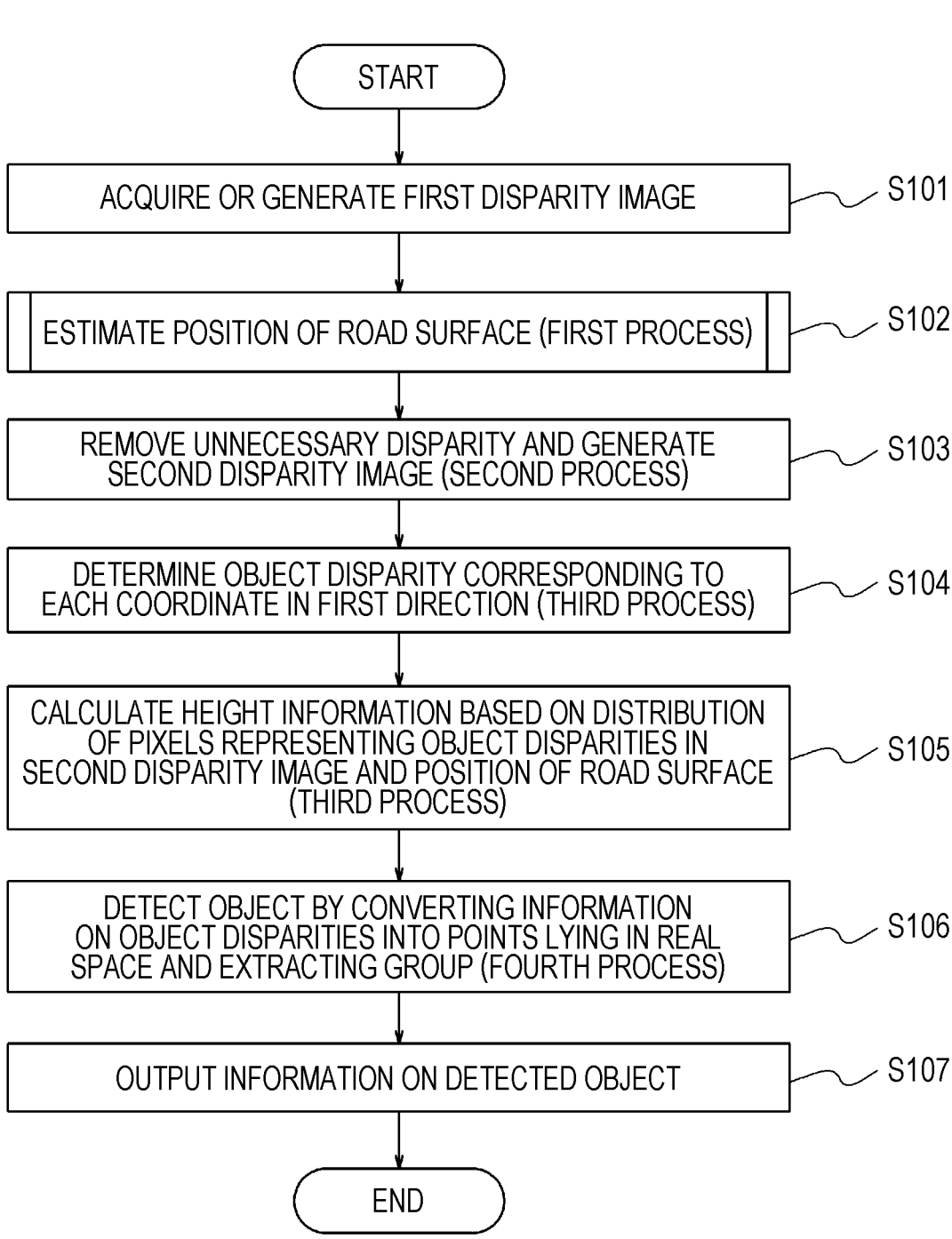
FIG. 5 is a flowchart illustrating an example of a process executed by the object detection device in FIG. 1.

A process executed by the functional blocks of the image processing unit 22 will further be described hereinafter with reference to a flowchart in FIG. 5. FIG. 5 is a flowchart describing the overall process for an object detection method executed by the object detection device 20.

Prior to the detailed description of processing performed in each of the steps of the flowchart in FIG. 5, a brief description of the overview and purpose of the processing of each of the steps will be given first.

Step S101 is a step of acquiring or generating a first disparity image to be used for object detection before a first process described below. Step S101 is performed by the acquisition unit 21 or the disparity image generation unit 25.

Step S102 is a step of estimating the position of the road surface. The processing performed in step S102 is also referred to as a first process (road surface detection process). Step S102 is performed by the road surface detection unit 26. The road surface position is estimated to find, in the first disparity image, a disparity representing the road surface with respect to the coordinate in the longitudinal direction. The road surface position is required to remove an unnecessary disparity in the subsequent processing and/or determine the height position of the road surface in the real space.

Step S103 is a step of removing an unnecessary disparity to generate a second disparity image. The processing performed in step S103 is also referred to as a second process (unnecessary disparity removal process). The second process is performed by the unnecessary disparity removal unit 27. An unnecessary disparity is a disparity represented by pixels corresponding to a subject whose height from the road surface in the real space is included in a predetermined range. For example, the unnecessary disparity includes a disparity of a road surface included in the first disparity image, a disparity of a structure included in an aerial portion, and the like. Removing the unnecessary disparity from the first disparity image makes it less likely to erroneously detect a lane line on the road surface, a structure in the sky above the road, and the like as an object on the road surface. Thus, the accuracy of object detection is improved. Step S103 may be omitted. When step S103 is omitted, the image processing unit 22 does not need to include the unnecessary disparity removal unit 27. The same applies to the following description.

In information processing performed in the image processing unit 22, the second disparity image undergoes various operations as a second disparity map obtained by removing unnecessary disparity information from the disparity information included in the first disparity map. The second disparity image can be translated to a second disparity map. In the following description, a process to be performed on the second disparity image can be translated to a process to be performed on the second disparity map.

Step S104 is a step of determining an object disparity for each coordinate in the transverse direction on the second disparity image. Step S104 is executed by the clustering unit 28. An object disparity is a disparity determined to be a disparity of an area that can be identified as an object in the real space under a predetermined condition. When step S103 is omitted, in step S104, the first disparity image is used instead of the second disparity image, and an object disparity is determined for each coordinate in the transverse direction on the first disparity image. The same applies to the following description.

Step S105 is a step of calculating height information associated with the object disparities on the basis of the distribution of the object disparities on the second disparity image and the position of the road surface estimated in step S102. Step S105 is executed by the clustering unit 28. The processing performed in steps S104 and S105 is also referred to as a third process (object disparity determination process). Step S105 can be omitted when no height information is required.

Step S106 is a step of detecting an object by converting information on the object disparities into coordinates in the real space and by extracting collections (groups) of object disparities. The processing performed in step S106 is also referred to as a fourth process (object detection process). The fourth process is performed by the grouping unit 29.

Step S107 is a step of outputting information on the detected object from the output unit 24. From the result of step S106, information on the position of the detected object and the width thereof viewed from the stereo camera 10 side is obtained. The information obtained in step S105 includes information of the height of the detected object. The information described above can be provided to other devices inside the mobile object 30.

Next, each of the steps will be described in detail.

First, the image processing unit 22 acquires or generates a first disparity image (step S101). In the object detection system 1 illustrated in FIG. 1, the image processing unit 22 generates the first disparity image on the basis of the first image and the second image acquired by the acquisition unit 21. The generation of the first disparity image is performed by the disparity image generation unit 25. In the object detection system 1A illustrated in FIG. 4, the image processing unit 22 acquires, through the acquisition unit 21, the first disparity image generated by the disparity image generation unit 25. The image processing unit 22 may store the first disparity image in the memory 23 for subsequent processing.

The disparity image generation unit 25 calculates a distribution of disparities in the first image acquired from the first camera 11 and the second image acquired from the second camera 12 and generates the first disparity image. A method for generating the first disparity image is known and will be briefly described hereinafter.

The disparity image generation unit 25 divides one of the first image and the second image (for example, the first image) into a large number of small areas. The small areas may be each a rectangular area in which a plurality of pixels are arranged in the longitudinal and transverse directions. For example, each of the small areas may be constituted by three pixels in the longitudinal direction and three pixels in the transverse direction. The numbers of pixels in the longitudinal and transverse directions of each small area is not limited to three. The numbers of pixels in the longitudinal direction and the transverse direction of each small area may be different. The disparity image generation unit 25 performs matching while shifting each of the images of the plurality of small areas obtained as a result of the division and the other image (for example, the second image) in the horizontal direction. One known method for image matching is a method using a SAD (Sum of Absolute Differences) function. This represents the sum of the absolute values of differences between corresponding luminance values in each small area. When the SAD function is the minimum, it is determined that both images are most similar. The method for stereo image matching is not limited to the method using the SAD function, and any other method may be used.

The disparity image generation unit 25 calculates a disparity for each small area on the basis of a difference in the positions of pixels in the transverse direction between two areas of the first image and the second image on which matching is performed. The magnitude of the disparity can be expressed in units of pixel width in the transverse direction. The magnitude of the disparity can be calculated with accuracy smaller than one pixel through interpolation processing. The magnitude of the disparity corresponds to the distance between the subject whose image is captured by the stereo camera 10 and the stereo camera 10 in the real space. A large disparity means a short distance, and a small disparity means a long distance. The disparity image generation unit 25 generates a first disparity image indicating a distribution of the calculated disparities. In the following, pixels representing the disparities forming the first disparity image are referred to as disparity pixels. The disparity image generation unit 25 can generate a disparity image with the same definition as that of the pixels of the original first and second images.

Figure 6:
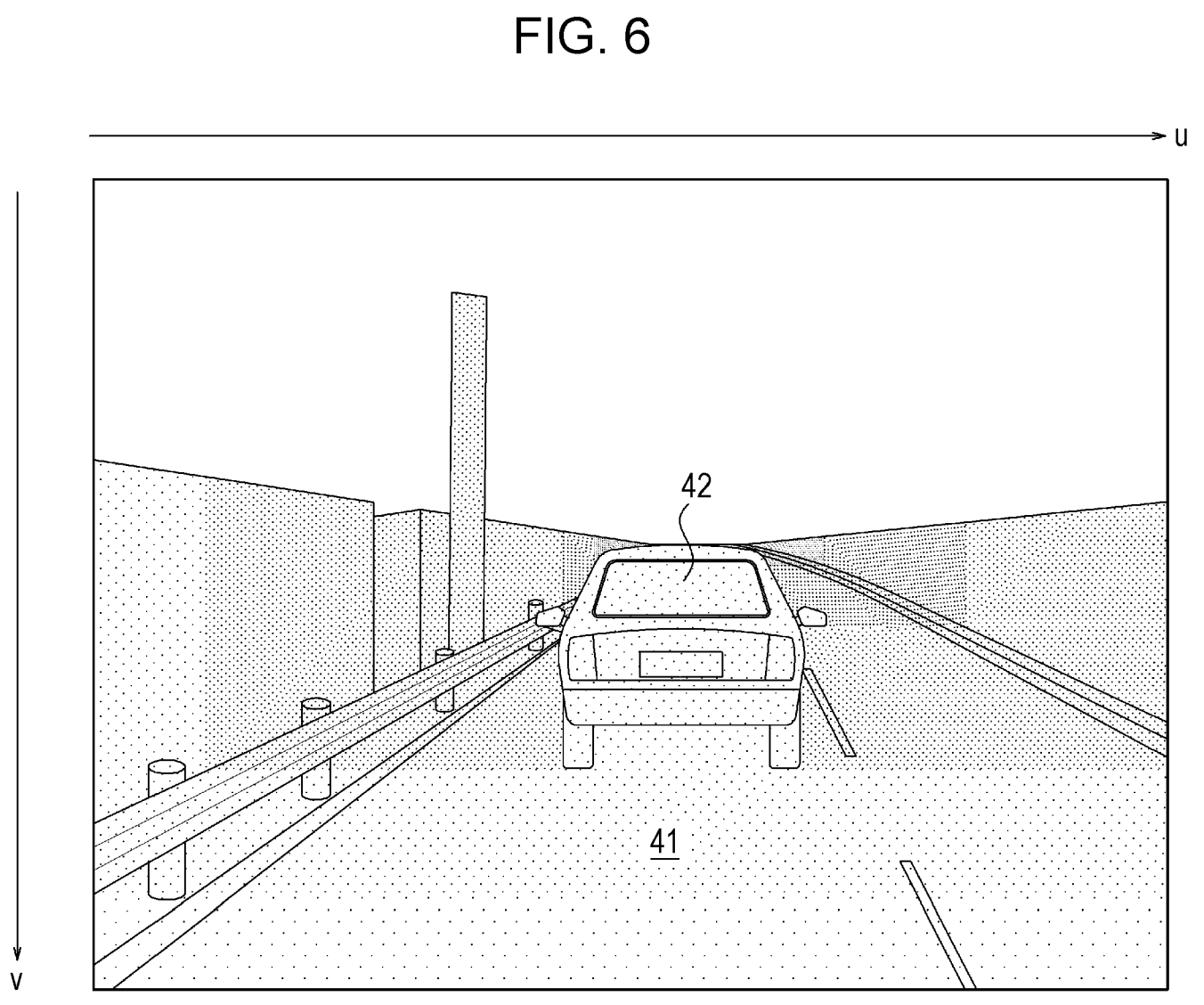

FIG. 6 is a diagram describing the first disparity image. In FIG. 6, another vehicle 42 is traveling on a road surface 41 ahead of the mobile object 30.

As illustrated in FIG. 6, in the first disparity image, pixels representing disparities are located on a two-dimensional plane formed by a transverse direction (first direction) of the stereo camera 10 and a longitudinal direction (second direction) orthogonal to the transverse direction. The coordinate indicating a position in the transverse direction is referred to as the u coordinate. The coordinate indicating a position in the longitudinal direction is referred to as the v coordinate. The u coordinate and the v coordinate are referred to as image coordinates. In each figure representing an image of the present disclosure, the u coordinate is assumed to be a coordinate from left to right. The v coordinate is assumed to be a coordinate from top to bottom. The origin of the u-v coordinate space can be the upper left end of the first disparity image. The u coordinate and the v coordinate can be expressed in units of pixels.

The disparity image generation unit 25 can display a difference in disparity as a difference in the luminance, color, or the like of a pixel. In FIG. 6, for convenience of illustration, disparities are represented by different types of shading. In FIG. 6, the darker the shading is, the smaller the disparity is, and the lighter the shading is, the larger the disparity is. FIG. 6 indicates that equally shaded areas are within a predetermined disparity range. In an actual first disparity image, the u-v coordinate space includes a portion where the disparity is easily acquired, and a portion where the disparity is not easily acquired. For example, in a portion of a subject that is spatially uniform, such as a window of the vehicle, and a portion that is overexposed due to the reflection of sunlight, the disparity is difficult to acquire. In the first disparity image, when an object and a structure are present, the disparities thereof are displayed with different luminance or in different color from the disparity of a more distant background.

The disparity image generation unit 25 does not need to display the first disparity image as an image after calculating the disparities. The disparity image generation unit 25 is only required to generate and hold information on the first disparity image as a first disparity map within the image processing unit 22 and to perform necessary processing.

After step S101, the image processing unit 22 performs the first process of estimating the position of the road surface 41 from the first disparity image (step S102). The first process is performed by the road surface detection unit 26. The process for estimating the road surface position, which is executed by the road surface detection unit 26, will be described hereinafter with reference to flowcharts in FIG. 7, FIG. 8, and FIG. 14. First, the road surface detection unit 26 extracts candidate road surface disparities $d_c$ from the first disparity image (step S201). The candidate road surface disparities $d_c$ are possible disparities corresponding to road surface disparities $d_r$ collected from the first disparity image. The road surface disparities $d_r$ refer to disparities of an area of the road surface 41. The road surface disparities $d_r$ do not include a disparity of an object on the road surface 41. The road surface disparities $d_r$ represent distances to corresponding portions on the road surface. The road surface disparities $d_r$ are collected as having close values at positions having the same v coordinate.

The details of the process for extracting the candidate road surface disparities $d_c$ are illustrated in the flowchart in FIG. 8. As illustrated in FIG. 8, the road surface detection unit 26 computes, based on the installation position of the stereo camera 10, a candidate-road-surface-disparity initial value $d_0$ that is an initial value of a disparity for calculating a candidate road surface disparity (step S301). The candidate-road-surface-disparity initial value $d_0$ is an initial value of a candidate road surface disparity at the extraction position of the candidate road surface disparity closest to the stereo camera 10. The extraction position of the candidate road surface disparity closest to the stereo camera 10 can be set from within, for example, a range from 1 m to 10 m from the stereo camera 10.

Figure 9:
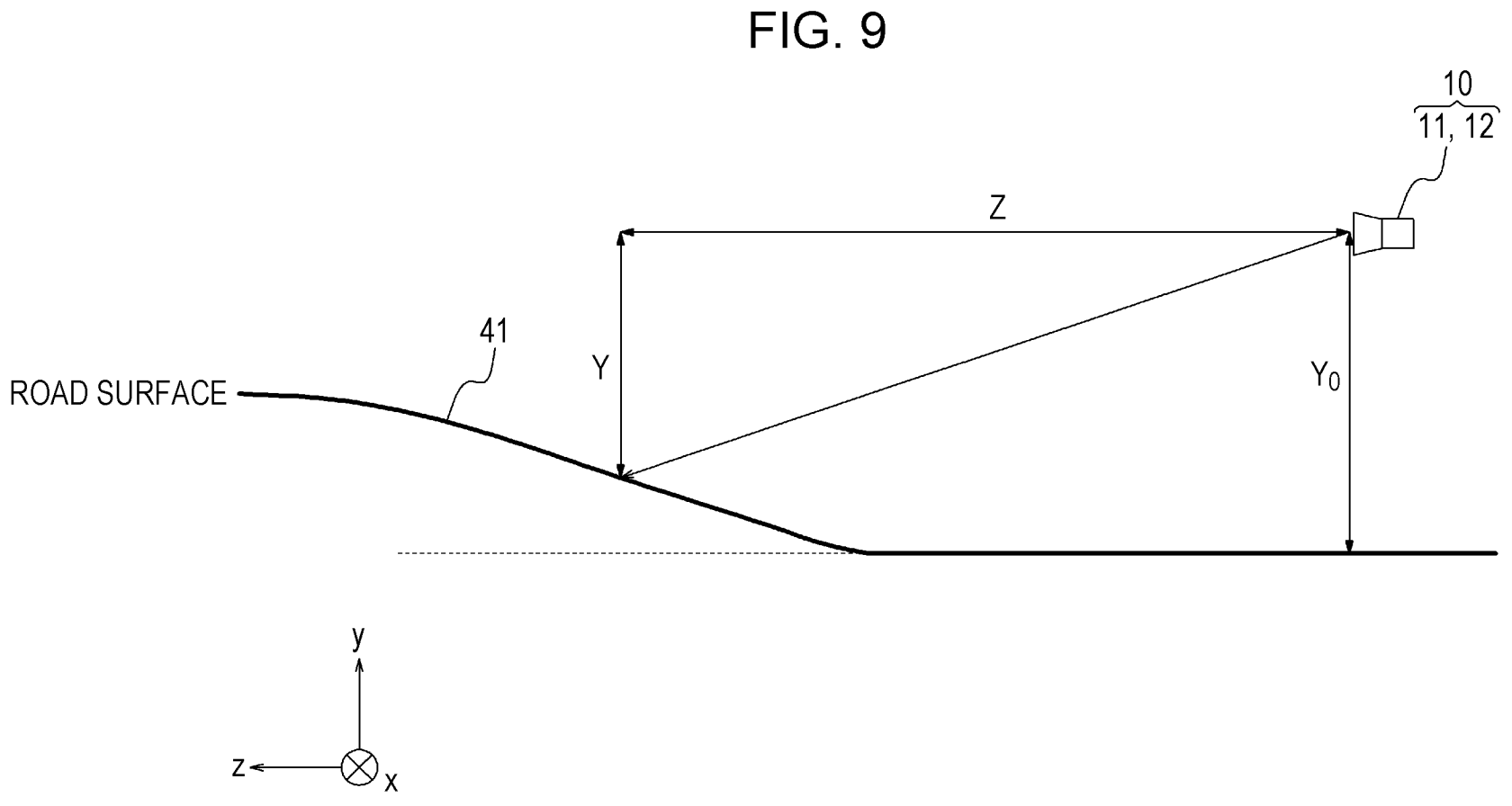

As illustrated in FIG. 9, a road surface height Y relative to the stereo camera 10 is the height of the stereo camera 10 in the vertical direction from the road surface 41 whose image is to be captured. A road surface height $Y_0$ is the height of the installation position of the stereo camera 10 from the road surface 41. Due to undulations of the road, the road surface height Y may change depending on the distance from the stereo camera 10. Accordingly, the road surface height Y at a position away from the stereo camera 10 does not match the road surface height $Y_0$ at the installation position of the stereo camera 10. In one of a plurality of embodiments, the first camera 11 and the second camera 12 of the stereo camera 10 are assumed to be installed such that the first camera 11 and the second camera 12 face forward with the optical axes OX thereof parallel to each other. In FIG. 9, Z indicates a distance to a specific road surface position in the horizontal direction. The base length of the stereo camera 10 is denoted by B, and the image size in the longitudinal direction is denoted by TOTALv. In this case, a relationship between a road surface disparity $d_s$ and the road surface height Y of the road surface 41 in a captured image at a certain longitudinal coordinate (v coordinate) is given by the following equation, regardless of the distance Z in the horizontal direction.

$$d_s = B/Y \times (v - TOTALv/2) \qquad (1)$$

The road surface disparity $d_s$ calculated by Equation (1) is also referred to as a "geometric estimated road surface disparity". In the following, the geometric estimated road surface disparity may be denoted by reference sign $d_s$.

The candidate-road-surface-disparity initial value $d_0$ is calculated on the assumption that the road surface 41 is flat and parallel to the optical axes OX of the first camera 11 and the second camera 12 between the stereo camera 10 and the extraction position of the candidate road surface disparity $d_c$ closest to the position of the stereo camera 10. In this case, the v coordinate of the extraction position of the candidate road surface disparity closest to the position of the stereo camera 10 in the first disparity image is determined to be a specific coordinate $v_0$. The coordinate $v_0$ is an initial value of the v coordinate at which a candidate road surface disparity is extracted. The coordinate $v_0$ is located between TOTALv/2 and TOTALv. The coordinate $v_0$ is located on the lowest side (the side on which the v coordinate is large) within the image coordinate range over which disparities can be calculated. The coordinate $v_0$ may be set to TOTALv, which corresponds to the lowermost row of the first disparity image. The candidate-road-surface-disparity initial value $d_0$ can be determined by substituting $v_0$ into v and substituting $Y_0$ into Y in Equation (1).

The road surface detection unit 26 computes, based on the candidate-road-surface-disparity initial value $d_0$, a disparity collection threshold in the first row whose v coordinate in the longitudinal direction is $v_0$ (step S302). A row refers to an array of pixels arranged in the transverse direction and having the same v coordinate in the first disparity image. The disparity collection threshold includes an upper-limit threshold that is the upper limit of threshold for collecting disparities, and a lower-limit threshold that is the lower limit of threshold for collecting disparities. The disparity collection threshold is set above and below the candidate-road-surface-disparity initial value $d_0$ under a predetermined rule so as to include the candidate-road-surface-disparity initial value $d_0$. Specifically, road surface disparities obtained when the road surface height Y changes up and down by a predetermined amount of change in road surface height $\Delta Y$ from a state in which the candidate-road-surface-disparity initial value $d_0$ is calculated are determined as the upper-limit threshold and the lower-limit threshold of the disparity collection threshold, respectively. That is, the lower-limit threshold of the disparity collection threshold is obtained by subtracting the disparity corresponding to the amount of change in road surface height $\Delta Y$ from the candidate-road-surface-disparity initial value $d_0$. The upper-limit threshold of the disparity collection threshold is obtained by adding the disparity corresponding to the amount of change in road surface height $\Delta Y$ to the candidate-road-surface-disparity initial value $d_0$. The lower-limit threshold and the upper-limit threshold of a specific disparity collection threshold are determined by changing the value of Y in Equation (1).

Subsequently, the road surface detection unit 26 repeatedly performs the processing between step S303 and step S307. First, the road surface detection unit 26 performs processing on the lowermost row of the first disparity image whose v coordinate is $v_0$ (step S303).

The road surface detection unit 26 collects disparities by using the disparity collection threshold (step S304). The road surface detection unit 26 collects, as the candidate road surface disparities $d_c$, among disparity pixels having a v coordinate of $v_0$ that are included in the first disparity image and that are arranged side by side in the transverse direction, disparity pixels having disparities between the lower-limit threshold and the upper-limit threshold of the disparity collection threshold. That is, the road surface detection unit 26 determines that disparity pixels having disparities falling within a predetermined margin range relative to the candidate-road-surface-disparity initial value $d_0$ calculated using Equation (1) are candidates of a disparity pixel representing a correct disparity of the road surface 41. The road surface detection unit 26 sets, as the candidate road surface disparities $d_c$, the disparities of the disparity pixels determined to be candidates of a disparity pixel representing a correct disparity of the road surface 41. This can make it less likely that the road surface detection unit 26 erroneously recognizes a disparity other than that of the road surface 41, such as of an object and a structure on the road surface 41, as the disparity of the road surface 41. Thus, the accuracy of detection of the road surface 41 is improved.

When the determination of all of the disparity pixels having a v coordinate of $v_0$ is completed in step S304, the road surface detection unit 26 averages the collected candidate road surface disparities $d_c$ to calculate an average candidate road surface disparity $d_{av}$ that is an average value of the candidate road surface disparities $d_c$ (step S305). The road surface detection unit 26 may store the candidate road surface disparities $d_c$, the u-v coordinates thereof, and the average candidate road surface disparity day at a v coordinate of $v_0$ in the memory 23.

After step S305, the road surface detection unit 26 calculates a disparity collection threshold for disparity pixels in a row one row above, that is, disparity pixels in a row whose v coordinate is $v=v_0-1$, from the average candidate road surface disparity $d_{av}$ at a v coordinate of $v_0$ calculated in step S305 (step S306). The road surface detection unit 26 changes the road surface height Y so that Equation (1) is satisfied for the average candidate road surface disparity $d_{av}$ at a v coordinate of $v_0$ calculated in step S305. The road surface detection unit 26 substitutes $v_0-1$, instead of $v_0$, into Equation (1) in which the road surface height Y is changed to calculate a geometric estimated road surface disparity $d_s$ at a v coordinate of $v_0-1$. The road surface detection unit 26 can set, as the lower-limit threshold of the disparity collection threshold, a disparity obtained by subtracting the disparity corresponding to the predetermined amount of change in road surface height $\Delta Y$ from the geometric estimated road surface disparity $d_s$ in a manner similar to that in step S302. The road surface detection unit 26 can set, as the upper-limit threshold of the disparity collection threshold, a disparity obtained by adding the disparity corresponding to the predetermined amount of change in road surface height $\Delta Y$ to the geometric estimated road surface disparity $d_s$.

Figure 10:
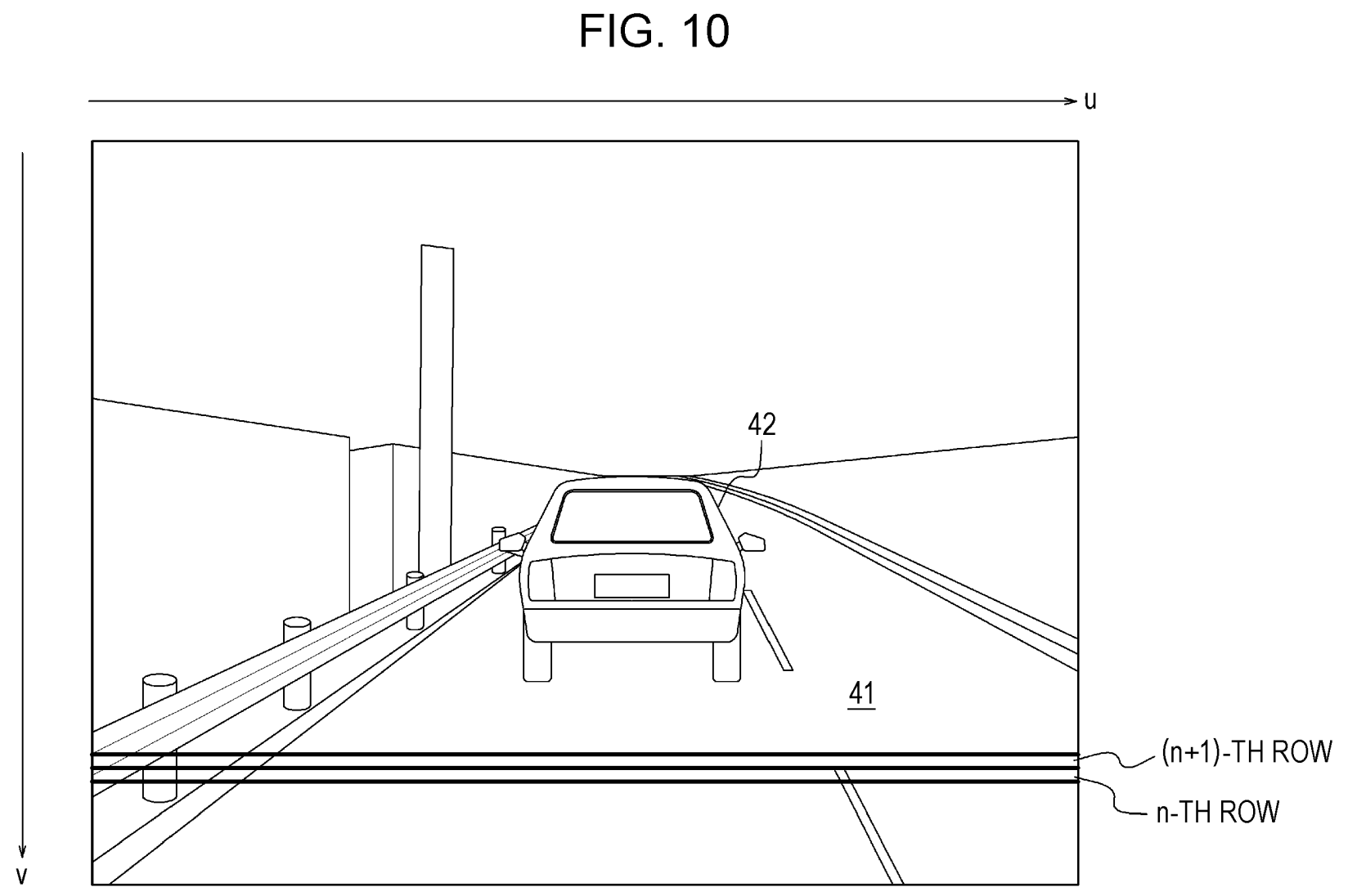

After step S306, the road surface detection unit 26 determines whether the geometric estimated road surface disparity $d_s$ calculated by Equation (1) is larger than a predetermined value. The predetermined value is, for example, one pixel. If the geometric estimated road surface disparity $d_s$ is larger than 1, the road surface detection unit 26 returns to the processing of step S303 (step S307). In step S303, the road surface detection unit 26 moves the extraction target of the candidate road surface disparities $d_c$ to a row one pixel above. That is, when the extraction target of the candidate road surface disparities $d_c$ is a row whose v coordinate is $v_0$, the road surface detection unit 26 changes the v coordinate of the row to be subjected to road surface detection to $v_0-1$. As illustrated in FIG. 10, when the candidate road surface disparities $d_c$ are to be calculated in the n-th row, the road surface detection unit 26 changes the row to be subjected to road surface detection to the (n+1)-th row. In FIG. 10, the width of each row in the longitudinal direction is increased for convenience of illustration. In actuality, each row is one pixel high. In this case, the v coordinate of the (n+1)-th row is smaller than the v coordinate of the n-th row by 1.

The processing of steps S304 to S306 to be performed on the (n+1)-th row is performed in a manner similar to that in the processing to be performed on the row whose v coordinate is $v_0$. In step S304, the road surface detection unit 26 collects the candidate road surface disparities $d_c$ by using the disparity collection threshold calculated in step S306 for the n-th row. In step S305, the road surface detection unit 26 averages the collected candidate road surface disparities $d_c$ to calculate the average candidate road surface disparity day. In step S306, the road surface detection unit 26 changes the road surface height Y in Equation (1) by using the average candidate road surface disparity day. The road surface detection unit 26 calculates the geometric estimated road surface disparity $d_s$ by using Equation (1) in which the road surface height Y is changed. Further, to extract the candidate road surface disparities $d_c$ in the (n+2)-th row, the road surface detection unit 26 calculates a disparity collection threshold in consideration of the amount of change in road surface height $\Delta Y$ for the geometric estimated road surface disparity $d_s$.

The road surface detection unit 26 extracts, while sequentially shifting the extraction target of the candidate road surface disparities $d_c$ upward (in the negative direction of the v coordinate) from the row corresponding to the extraction position of the candidate road surface disparity $d_c$ closest to the stereo camera 10, the candidate road surface disparities $d_c$ corresponding to the v coordinate. The road surface detection unit 26 may store the extracted candidate road surface disparities $d_c$ in the memory 23 together with the corresponding u coordinate and v coordinate and the average candidate road surface disparity day corresponding to the v coordinate.

If the geometric estimated road surface disparity $d_s$ calculated by Equation (1) is less than or equal to the predetermined value described above in step S307, the road surface detection unit 26 ends the process of extracting the candidate road surface disparities $d_c$, and then returns to step S201 of the flowchart in FIG. 7. The predetermined value can be, for example, one pixel.

As described above, in the flowchart in FIG. 8, the initial value of the v coordinate for extracting the candidate road surface disparities $d_c$ is set to $v_0$ corresponding to the position on the short-distance side as viewed from the stereo camera 10, and the candidate road surface disparities $d_c$ on the long-distance side are sequentially extracted. The stereo camera 10 typically has higher accuracy of detection of disparity on the short-distance side than on the long-distance side. For this reason, sequentially extracting the candidate road surface disparities $d_c$ from the short-distance side to the long-distance side can increase the accuracy of the candidate road surface disparities $d_c$ to be detected.

In the flowchart in FIG. 8 for extracting the candidate road surface disparities $d_c$ described above, the candidate road surface disparities $d_c$ are calculated for each coordinate in the longitudinal direction. In other words, in the flowchart for extracting the candidate road surface disparities $d_c$ described above, the candidate road surface disparities $d_c$ are calculated for each row of one pixel in the longitudinal direction. The unit by which candidate road surface disparities are calculated is not limited to this. The candidate road surface disparities $d_c$ can be calculated in units of a plurality of coordinates in the longitudinal direction.

After the process of extracting the candidate road surface disparities $d_c$ in steps S301 to S307, the road surface detection unit 26 proceeds to step S202 of the flowchart in FIG. 7. When sequentially estimating the road surface disparities $d_r$ from the short-distance side to the long-distance side, the road surface detection unit 26 sequentially applies a Kalman filter to the road surface disparities $d_r$. Accordingly, first, the road surface detection unit 26 initializes the Kalman filter (step S202). The initial value of the Kalman filter can be the value of the average candidate road surface disparity $d_{av}$ calculated in step S305, which corresponds to the lowest row (the row whose value of the v coordinate has the value $v_0$) among the rows in which road surface disparities $d_r$ are to be estimated.

The road surface detection unit 26 sequentially executes the subsequent processing of steps S203 to S210 while changing the target row from the short-distance side to the long-distance side of the road surface 41 (step S203).

First, the road surface detection unit 26 generates, for the target row in the first disparity image, a histogram representing frequency for each of the values of the road surface disparities $d_r$ from the candidate road surface disparities $d_c$ located within the range of a certain width in the real space (step S204). The range of a certain width in the real space is a range that takes into account the width of the travel lane of the road. The certain width can be set to a value, for example, 2.5 m or 3.5 m. The range for acquiring disparities is initially set to, for example, a range surrounded by a solid-line frame 50 in FIG. 11. The certain width is stored in advance in the memory 23 or the like of the object detection device 20. Limiting the range for acquiring disparities to this range makes it less likely that the road surface detection unit 26 erroneously recognizes an object or a structure such as a soundproof wall other than the road surface 41 as the road surface 41 and extracts the object or the structure. Thus, the accuracy of road surface detection can be improved. As described below, the range for acquiring disparities, which is indicated by the solid line in FIG. 11, can be sequentially changed from the initially set frame 50 in accordance with the situation on the road ahead.

The road surface detection unit 26 sets, for the target row, a range for acquiring the road surface disparities $d_r$ on the basis of the values of the road surface disparities $d_r$ predicted by the Kalman filter. The range for acquiring the road surface disparities $d_r$ is a range determined on the basis of the reliability calculated when the Kalman filter predicts the road surface disparities $d_r$ in the next row. The reliability is expressed by the variance $\sigma^2$ of a Gaussian distribution ($\sigma$ is a standard deviation of the road surface disparities $d_r$). The road surface detection unit 26 can use the predicted value$\pm2\sigma$ or the like to determine the range for acquiring the road surface disparities $d_r$. The road surface detection unit 26 extracts, from the histogram of the candidate road surface disparities $d_c$ generated in step S204, the road surface disparity $d_r$ having the maximum frequency within the range set on the basis of the Kalman filter for acquiring the road surface disparities $d_r$. The road surface detection unit 26 sets the extracted road surface disparity $d_r$ as an observation value of the road surface disparities $d_r$ in the target row (step S205).

Figure 12:
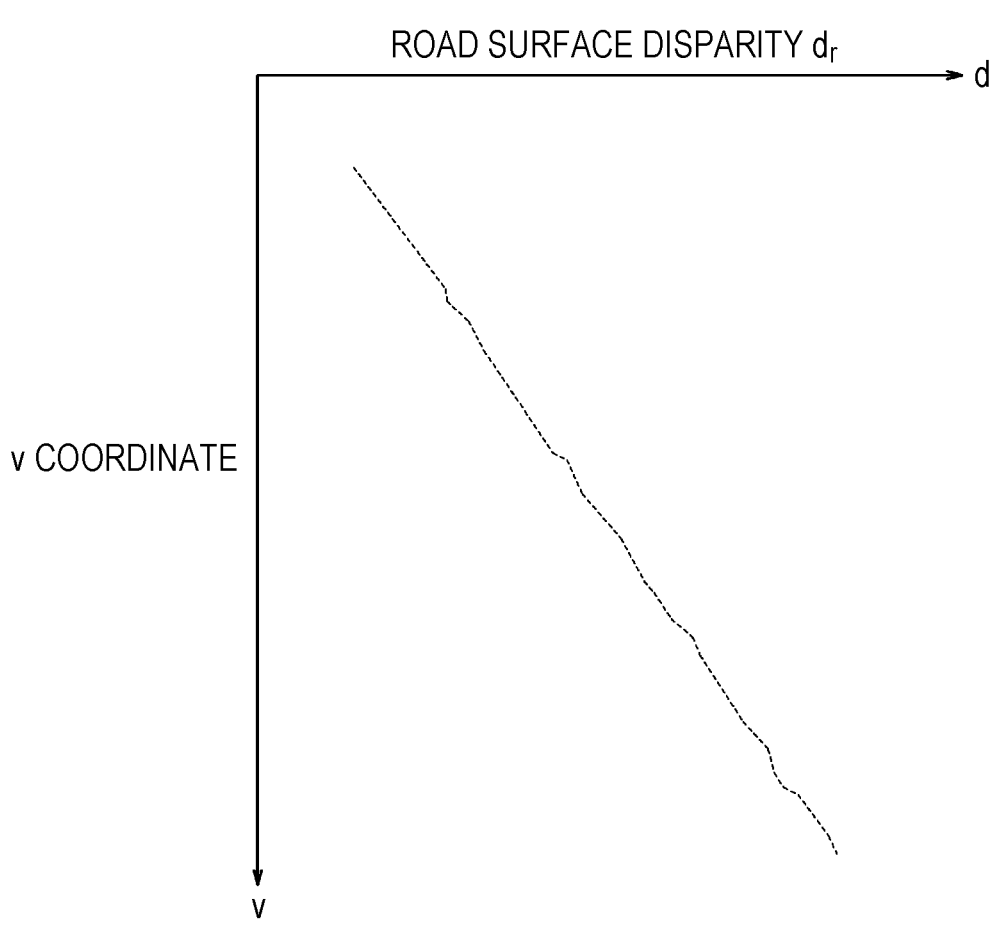
FIG. 12 is a d-v correlation diagram illustrating an example of a relationship between a road surface disparity $d_r$ and a coordinate in the longitudinal direction (v coordinate).

Then, the road surface detection unit 26 confirms that the road surface disparity $d_r$ determined in step S205 is a correct road surface disparity $d_r$ that does not include a disparity or the like of an object (step S206). The road surface detection unit 26 generates a d-v correlation diagram in which all of the road surface disparities $d_r$ detected in each of the rows up to the row currently being processed are mapped to a d-v coordinate space having the road surface disparity $d_r$ and the v coordinate as coordinate axes. If the road surface 41 is correctly detected, in the d-v correlation diagram, as the value of the v coordinate decreases, the road surface disparity $d_r$ also decreases linearly, as indicated by the broken line in FIG. 12.

Figure 13:
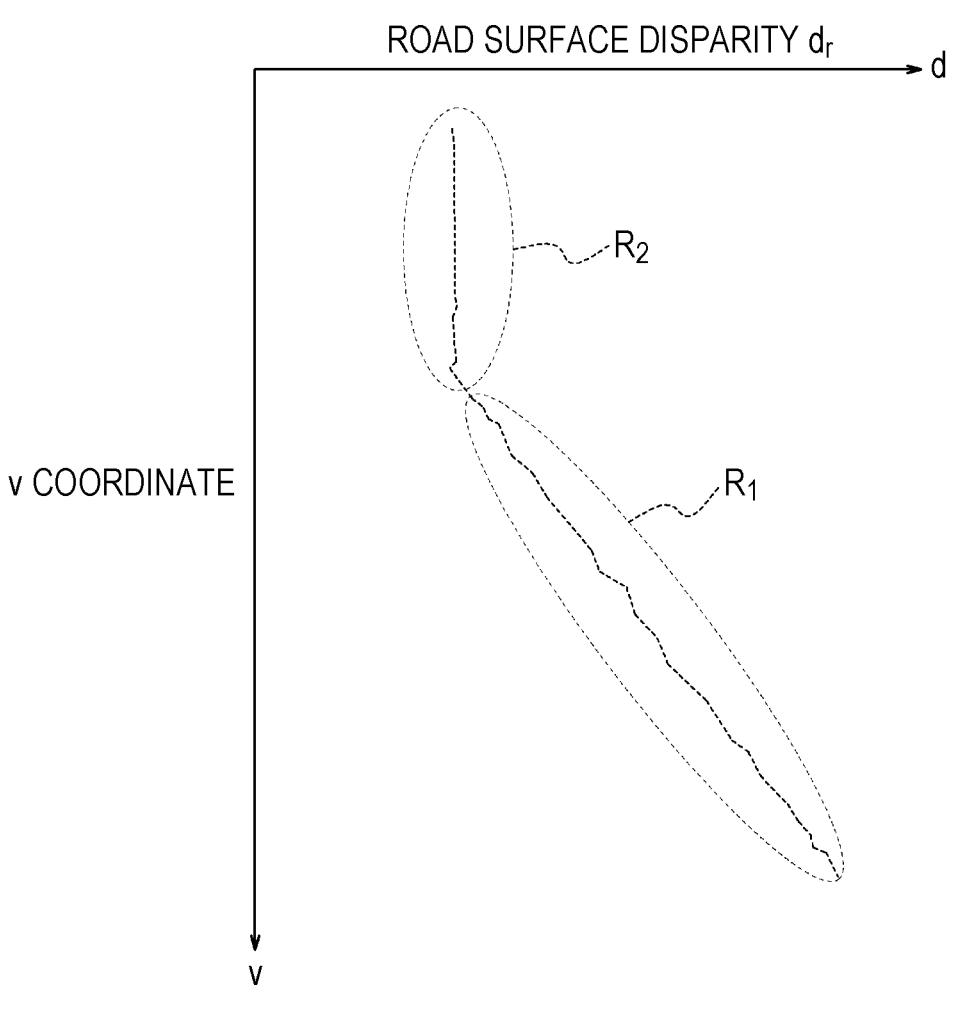
FIG. 13 is a diagram describing a method for sensing whether an object that does not correspond to a road surface disparity is included.

In contrast, if a disparity of an object is erroneously recognized as the road surface 41, as illustrated in FIG. 13, in the d-v correlation diagram, the disparity d is substantially constant in the portion of the disparity representing the object regardless of a change in the coordinate in the longitudinal direction (v coordinate). A typical object includes a portion perpendicular to the road surface 41 and is thus displayed in the first disparity image so as to include a large number of equidistant disparities. In FIG. 13, in a first portion $R_1$, the disparity d decreases with a change in the value of the v coordinate. The first portion $R_1$ is a portion where the road surface 41 is correctly detected. In a second portion $R_2$, the disparity d is constant even upon a change in v coordinate. The second portion $R_2$ is considered to be a portion where an object is erroneously detected. In response to a predetermined number of consecutive rows having substantially equal values of the disparity d, the road surface detection unit 26 can determine that an object is erroneously recognized.

If it is determined in step S206 that the disparity is not the correct road surface disparity $d_r$ (step S206: No), the road surface detection unit 26 re-searches for the road surface disparity $d_r$ from the row in which an object is determined to be erroneously detected (step S207). In step S207, the road surface detection unit 26 re-searches a road surface disparity histogram in an area of a row in which the disparity d does not change even upon a change in the value of the v coordinate. If, in this area, a portion of a disparity smaller than the disparity d determined in step S205 includes a disparity with high frequency, the road surface detection unit 26 can determine that this disparity is an observation value of the correct road surface disparity $d_r$.

Figure 11:
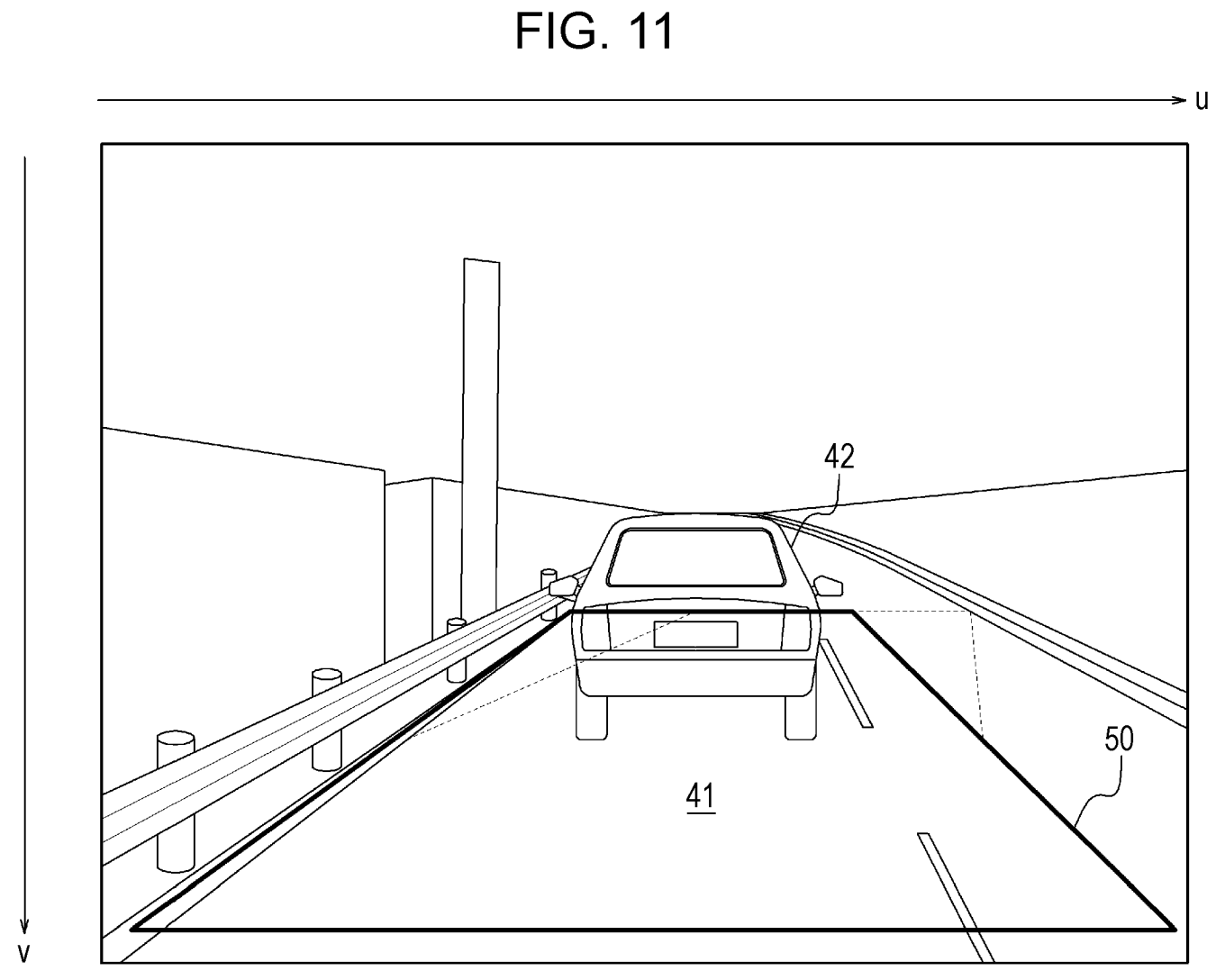

If it is determined in step S206 that the road surface disparity $d_r$ is correct (step S206: Yes) or when the re-search for the road surface disparity $d_r$ is completed in step S207, the road surface detection unit 26 proceeds to step S208. In step S208, the road surface detection unit 26 determines a range in the transverse direction of the road surface 41 in the first disparity image that is the target of generating a histogram for the next row shifted by one pixel in the longitudinal direction. For example, as illustrated in FIG. 11, if another vehicle 42 is on the road surface 41, the road surface detection unit 26 fails to acquire the correct road surface disparity $d_r$ of a portion of the road surface 41 that overlaps the other vehicle 42. If a range of the road surface 41 within which the road surface disparity $d_r$ can be acquired is narrow, it is difficult for the road surface detection unit 26 to acquire the correct road surface disparity $d_r$. Accordingly, as indicated by the broken line in FIG. 11, the road surface detection unit 26 sequentially changes the range for acquiring the candidate road surface disparities $d_c$ in the transverse direction. Specifically, if it is determined in step S206 that an object is included, the road surface detection unit 26 detects on which side of the object in the transverse direction a larger number of candidate road surface disparities $d_c$ representing the correct road surface disparity $d_r$ are present. In the next row, the road surface detection unit 26 sequentially shifts the range for acquiring disparities to the side in the transverse direction on which a larger number of candidate road surface disparities $d_c$ representing the correct road surface disparity $d_r$ are present (in FIG. 11, to the right).

Then, the road surface detection unit 26 updates the Kalman filter by using the road surface disparity $d_r$ in the current row determined in step S205 or S207 (step S209). That is, the Kalman filter calculates the estimated value of the road surface disparity $d_r$ on the basis of the observation value of the road surface disparities $d_r$ in the current row. When the estimated value in the current row is calculated, the road surface detection unit 26 adds the estimated value of the road surface disparity $d_r$ in the current row as a portion of previous data, and uses the estimated value for the process of calculating the estimated value of the road surface disparity $d_r$ in the next row. It is considered that the height of the road surface 41 does not suddenly change up and down with respect to the distance Z from the stereo camera 10 in the horizontal direction. In estimation using the Kalman filter of this embodiment, accordingly, it is estimated that the road surface disparity $d_r$ in the next row is present near the road surface disparity $d_r$ in the current row. As described above, the road surface detection unit 26 limits the disparity range for generating a histogram for the next row to be near the road surface disparity $d_r$ in the current row, thereby making it less likely to erroneously detect an object other than the road surface 41. In addition, the amount of arithmetic processing executed by the road surface detection unit 26 can be reduced, and the processing speed can be increased.

If the road surface disparity $d_r$ estimated by the Kalman filter is larger than a predetermined value in step S209, the road surface detection unit 26 returns to step S203 and repeatedly performs the processing of steps S203 to S209. If the road surface disparity $d_r$ estimated by the Kalman filter is less than or equal to the predetermined value (step S210), the road surface detection unit 26 proceeds to the next processing (step S211). The predetermined value can be, for example, one pixel.

In step S211, the road surface detection unit 26 approximates the relationship between the image coordinate v in the longitudinal direction and the estimated road surface disparity $d_r$ with two straight lines in the d-v correlation diagram. The road surface disparity $d_r$ is related to the distance Z from the stereo camera 10. The value of the v coordinate is associated with the distance Z from the stereo camera 10 and the road surface height Y. Thus, approximating the relationship between the v coordinate and the road surface disparity $d_r$ with two straight lines can be regarded as approximating the relationship between the distance from the stereo camera 10 and the height of the road surface 41 with two straight lines. The processing of step S211 will be described in detail in the flowchart in FIG. 14.

First, the processing up to step S210 in FIG. 7 is performed to obtain a correlation between the road surface disparity $d_r$ and the v coordinate. For example, as indicated by a broken-line graph 51 in FIG. 15, the correlation between the v coordinate and the road surface disparity $d_r$ is shown in the d-v coordinate space. When the road surface 41 is flat with no change in inclination in the real space, the graph 51 shows a straight line. However, due to changes in the undulation of the actual road surface 41, such as rising and falling, the inclination of the road surface 41 may change. When the inclination of the road surface 41 changes, the graph 51 in the d-v coordinate space cannot be represented by a straight line. If a change in the inclination of the road surface 41 is to be approximated with three or more straight lines or a curved line, the processing load on the object detection device 20 is large. In the present application, accordingly, the graph 51 is approximated with two straight lines.

Figure 15:
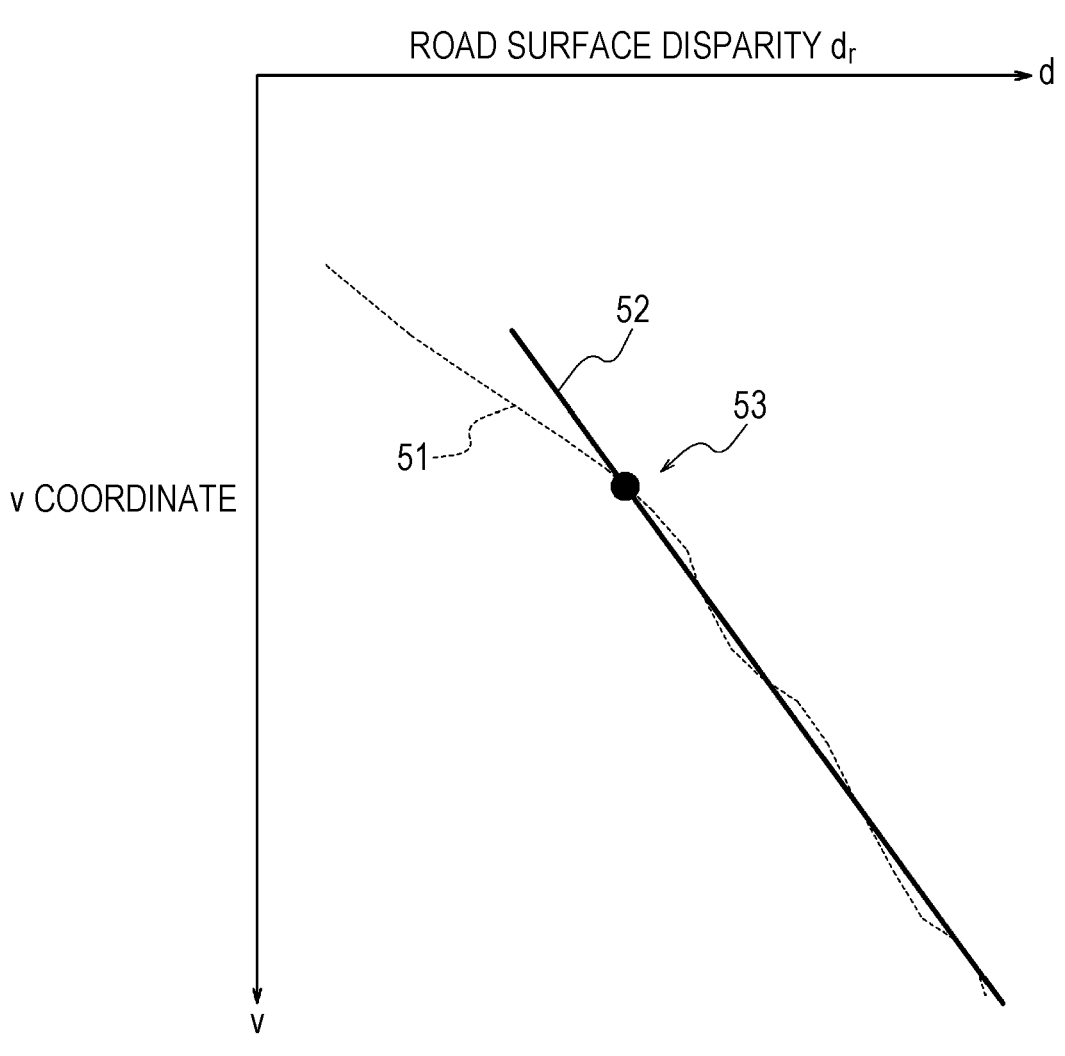
FIG. 15 is a diagram describing approximation of the road surface disparity $d_r$ with a first straight line.

As illustrated in FIG. 15, the road surface detection unit 26 approximates the estimated road surface disparity $d_r$ on the lower side (the short-distance side) in the d-v coordinate space with a first straight line 52 by using the least squares method (step S401). The approximation with the first straight line 52 can be performed in a range up to a road surface disparity $d_r$ corresponding to a predetermined distance in the distance range to be subjected to object detection by the object detection device 20. The predetermined distance can be a distance that is one half the distance range to be subjected to object detection by the object detection device 20. For example, in a case where the object detection device 20 is designed to detect an object that is 100 m ahead, the first straight line 52 may be determined so as to be closest to the graph 51 by using the least squares method within a range from the closest distance that can be measured by the stereo camera 10 to 50 m ahead.

Then, the road surface detection unit 26 determines whether the inclination of the road surface 41 represented by the first straight line 52 used for approximation in step S401 is a possible inclination as the road surface 41 (step S402). The inclination angle of the first straight line 52 is converted into a plane in the real space. The inclination of the first straight line 52 corresponds to the inclination angle of the road surface 41 in the yz plane, which is determined in accordance with conditions such as the base length B and the road surface height $Y_0$ at the installation position of the stereo camera 10. If the inclination of the road surface 41 in the real space corresponding to the first straight line 52 is within a range of predetermined angles relative to a horizontal plane in the real space, the road surface detection unit 26 can determine that the inclination of the road surface 41 is a possible inclination. If the inclination of the road surface 41 in the real space corresponding to the first straight line 52 is outside the range of predetermined angles relative to the horizontal plane in the real space, the road surface detection unit 26 can determine that the inclination of the road surface 41 is not a possible inclination. The predetermined angles can be set as appropriate in consideration of the environment in which the mobile object 30 is traveling.

If it is determined in step S402 that the inclination of the first straight line 52 is not a possible inclination as the road surface 41 (step S402: No), the road surface detection unit 26 determines the first straight line 52 on the basis of a theoretical road surface based on the assumption that the road surface 41 is flat (step S403). The theoretical road surface can be calculated on the basis of installation conditions such as the road surface height $Y_0$ at the installation position of the stereo camera 10, the installation angle, and the base length B. If the road surface disparity $d_r$ calculated from the image is not reliable, the road surface detection unit 26 adopts the road surface disparity of the theoretical road surface. For example, if a disparity of an object or a structure other than the road surface 41 is erroneously extracted as the road surface disparity $d_r$, the road surface detection unit 26 may determine that the road surface 41 has an unrealistic inclination, and may be able to exclude the error. This can make it less likely that a disparity of an object or a structure other than the road surface 41 is erroneously determined as the road surface disparity $d_r$.

If the road surface detection unit 26 determines in step S402 that the inclination of the first straight line 52 is a possible inclination as the road surface 41 (step S402: Yes) or after step S403, the road surface detection unit 26 proceeds to the processing of step S404. In step S404, the road surface detection unit 26 determines an approximation start point 53 at which the approximation of a second straight line 55 is started. The road surface detection unit 26 calculates an approximation error of the first straight line 52 with respect to the graph 51 from the smallest v coordinate side (the long-distance side) to the large v coordinate side (the short-distance side), and can set, as the approximation start point 53, the coordinates on the first straight line 52 from which the approximation error is continuously smaller than a predetermined value. Alternatively, an approximation error of the first straight line 52 with respect to the graph 51 may be calculated from the largest v coordinate side (the short-distance side) to the small v coordinate side (the long-distance side), and the approximation start point 53 may be determined as the coordinates on the first straight line 52 at which the approximation error is larger than a predetermined value. The v coordinate of the approximation start point 53 is not limited to a specific value. The approximation start point 53 may be set at the position of the v coordinate corresponding to a position closer to the stereo camera 10 than a distance that is one half the distance range to be subjected to object detection by the object detection device 20 on the first straight line 52. For example, when the road surface 41 is approximated with the first straight line 52 within a range from the closest distance that can be measured to 50 m ahead, the approximation start point 53 may be set at the position of the v coordinate corresponding to 40 m before 50 m.

Figure 16:
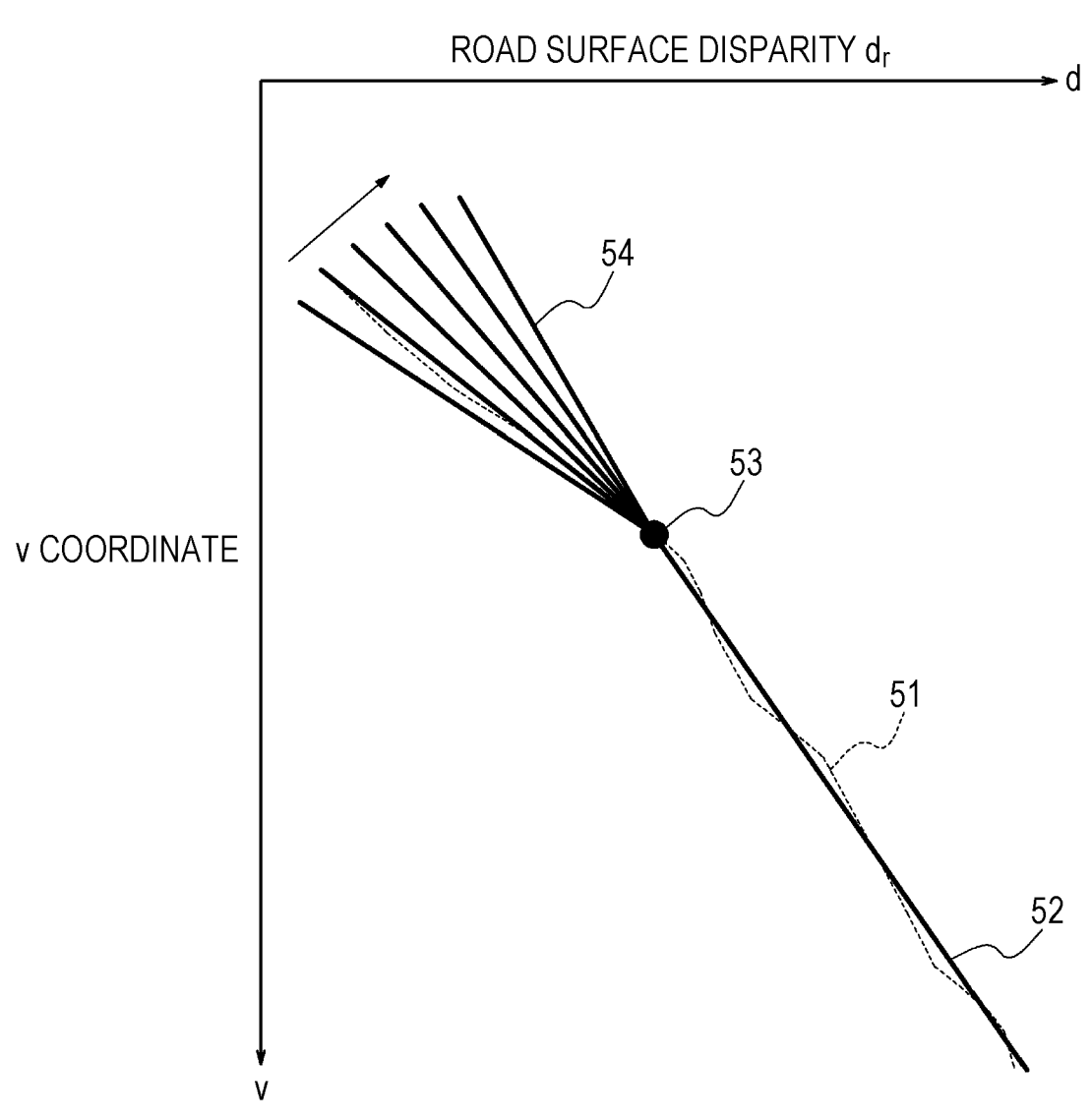
FIG. 16 is a diagram describing a method for determining a second straight line.

After step S404, the road surface detection unit 26 repeatedly executes steps S405 to S407. As illustrated in FIG. 16, the road surface detection unit 26 sequentially selects candidate straight lines 54, which are candidates of the second straight line 55 with the approximation start point 53 as a starting point, as angles whose angle differences from the first straight line 52 are selected from a predetermined angle range (step S405). The predetermined angle range is set as angles over which the slope of the road can change in a distance range to be measured. The predetermined angle range can be, for example, ±3 degrees. For example, the road surface detection unit 26 can sequentially change the angles of the candidate straight lines 54 to angles in increments of 0.001 degrees, starting from −3 degrees of the angle of the first straight line 52 to +3 degrees of the angle of the first straight line 52.

The road surface detection unit 26 computes, for the selected candidate straight lines 54, an error relative to a portion above the approximation start point 53 of the graph (the long-distance side) in the d-v coordinate space (step S406). The error can be computed by using the mean square error of the disparity d with respect to the v coordinate. The road surface detection unit 26 may store the error computed for each candidate straight line 54 in the memory 23.

Figure 17:
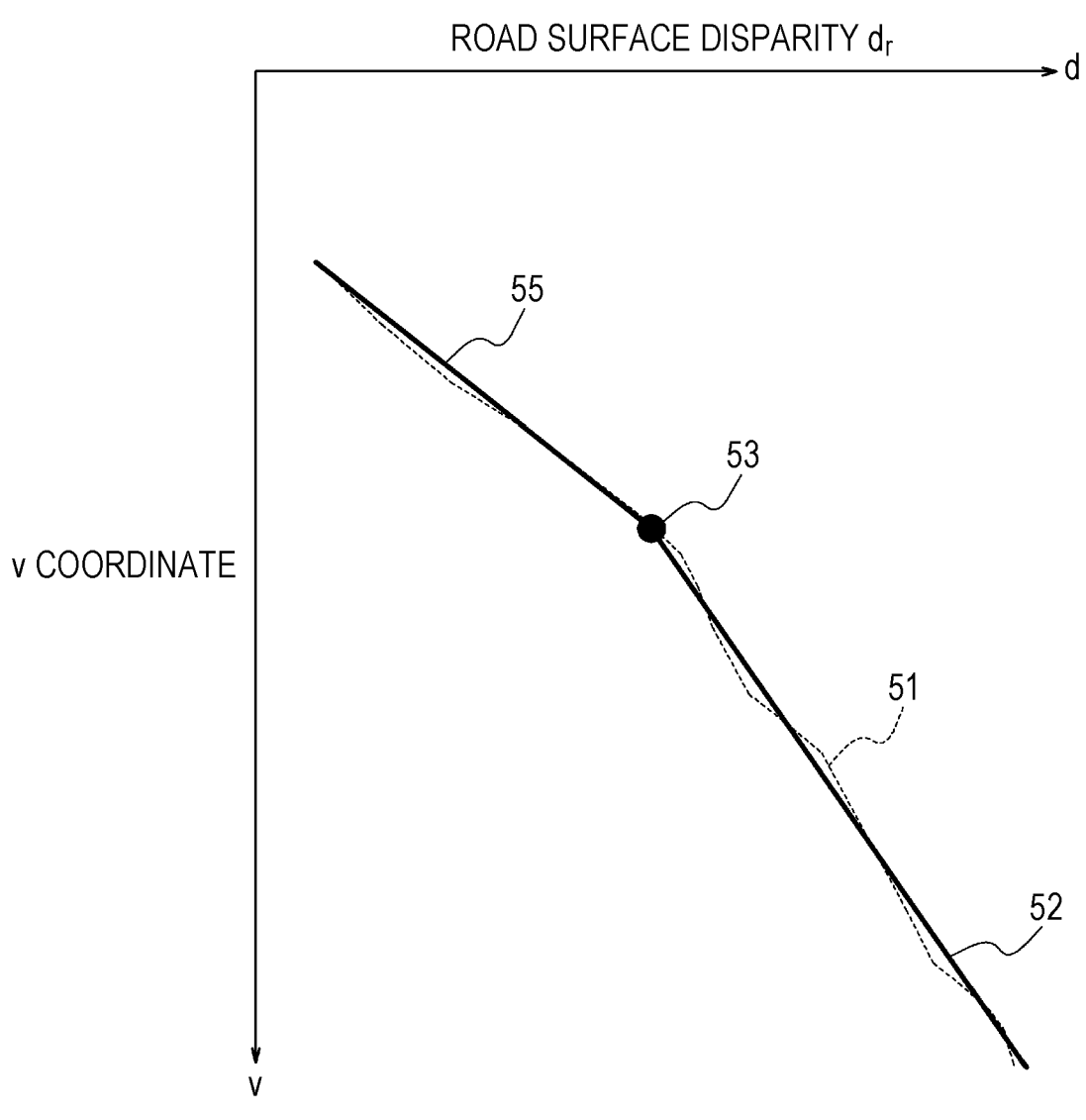
FIG. 17 is a diagram illustrating an example of a result of the approximation of a relationship between the road surface disparity $d_r$ and the coordinate in the longitudinal direction (v coordinate) of an image with straight lines.

When the computation of the errors for all of the candidate straight lines 54 within the angle range is completed (step S407), the road surface detection unit 26 searches the errors stored in the memory 23 for the minimum error. As illustrated in FIG. 17, the road surface detection unit 26 selects the candidate straight line 54 having the minimum error as the second straight line 55 (step S408).

When the second straight line 55 is determined in step S408, the road surface detection unit 26 determines whether the error between the second straight line 55 and the graph 51 is within a predetermined value (step S409). The predetermined value is set as appropriate to obtain the desired accuracy of road surface estimation.

If the error is within the predetermined value in step S409 (step S409: Yes), the road surface disparity $d_r$ is approximated using the first straight line 52 and the second straight line 55.

If the error exceeds the predetermined value in step S409 (step S409: No), the road surface detection unit 26 extends the first straight line 52 upward (the long-distance side) and overwrites the approximation result (step S410). As described above, the road surface disparity $d_r$ is approximated with two straight lines.

Approximating the road surface disparity $d_r$ with respect to the v coordinate with two straight lines allows the road surface position to be approximated with two straight lines. As a result, compared to approximation of the road surface position with a curved line or three or more straight lines, the load of the subsequent computation is reduced, and the speed of the object detection process is increased. In addition, compared to approximation of the road surface with a single straight line, the error from the actual road surface is small. Furthermore, since the v coordinate of the approximation start point 53 of the second straight line 55 is not fixed to a predetermined coordinate, the accuracy of approximation to the actual road surface can be improved compared to a case where the coordinates of the approximation start point 53 are fixed in advance.

If the error is within the predetermined value in step S409 (step S409: Yes) or after step S410, the process of approximating the road surface disparity $d_r$ with straight lines ends, and then returns to step S212 in FIG. 7.

In step S212, a threshold for the road surface disparity $d_r$ to be removed from the first disparity image is determined (step S212). The threshold for the road surface disparity $d_r$ to be removed from the first disparity image corresponds to a first height described below. The first height can be calculated such that the road surface disparity $d_r$ is removed in the subsequent processing of step S103.

Figure 18:
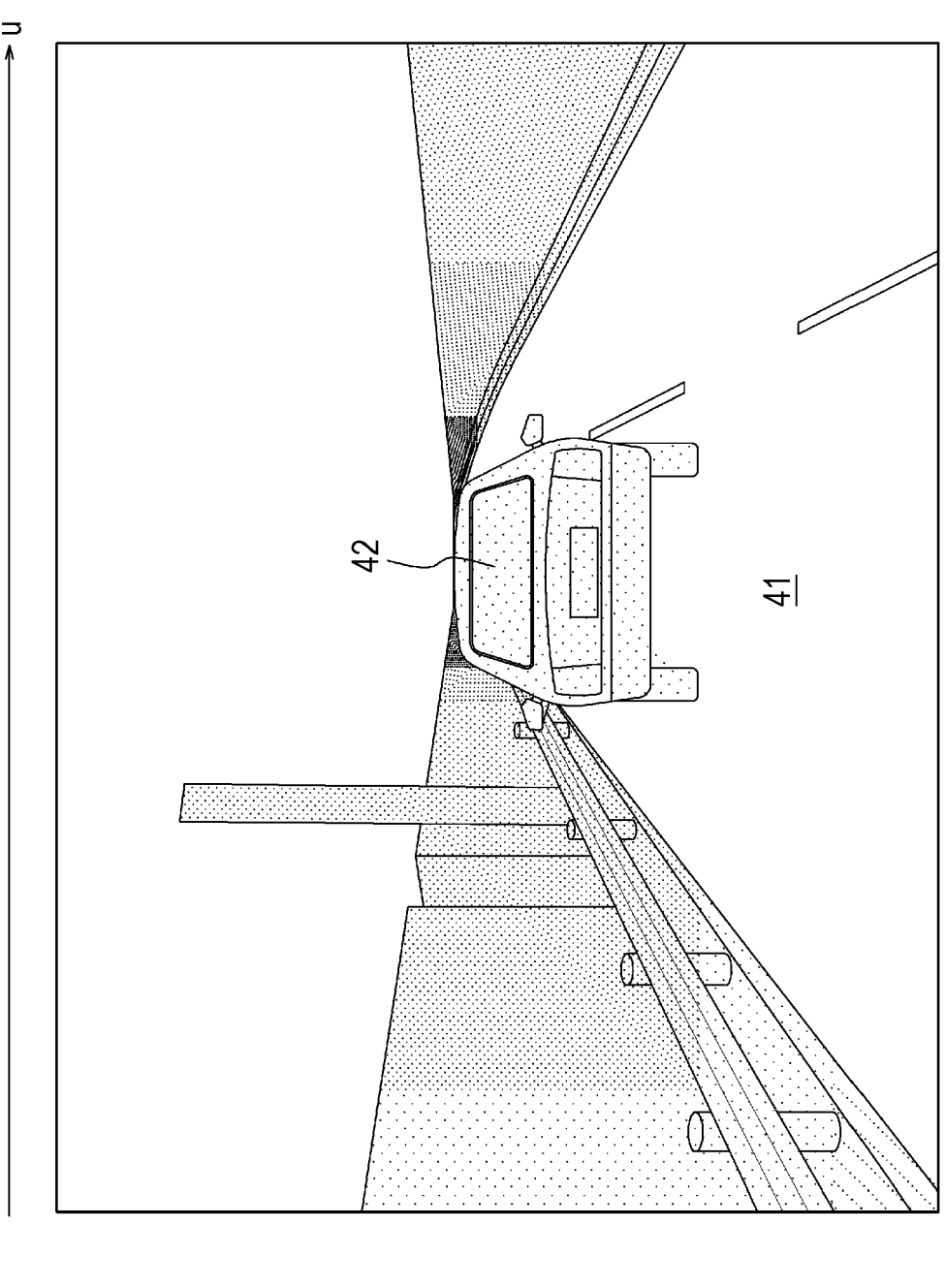
FIG. 18 is a diagram describing an example of a second disparity image after unnecessary disparity is removed.

Then, the process of the image processing unit 22 returns to the flowchart in FIG. 5. The unnecessary disparity removal unit 27 of the image processing unit 22 acquires from the road surface detection unit 26 an approximate expression in which the relationship between the v coordinate and the road surface disparity $d_r$ in the d-v coordinate space is approximated with two straight lines. From the approximate expression representing the relationship between the v coordinate and the road surface disparity $d_r$ in the d-v coordinate space, the relationship between the distance Z and the road surface height Y ahead of the stereo camera 10 in the real space is obtained. The unnecessary disparity removal unit 27 executes (the second process) on the basis of the approximate expression (step S103). The second process is a process for removing, from the first disparity image, disparity pixels corresponding to a subject whose height from the road surface 41 in the real space is less than or equal to a first height and disparity pixels corresponding to a subject whose height from the road surface 41 is greater than or equal to a second height. As a result, the unnecessary disparity removal unit 27 generates a second disparity image as illustrated in FIG. 18 from the first disparity image illustrated in FIG. 6. FIG. 18 is a diagram prepared for explanation. An actual second disparity image based on an image acquired from the stereo camera 10 is, for example, illustrated in FIG. 19. In FIG. 19, the magnitudes of the disparities are expressed by the density of black and white.

The first height can be set to, for example, a value larger than 15 cm and smaller than 50 cm. If the first height is set to a value smaller than 15 cm, the unnecessary disparity removal unit 27 easily detects a subject other than an object on the road, which is caused by irregularities of the road surface 41 and/or an error of the approximate expression or the like. This may cause an error in detection or a reduction in detection speed. If the first height is set to be larger than 50 cm, the unnecessary disparity removal unit 27 may fail to detect a child and/or a large obstacle or the like on the road surface 41.

The second height can be set on the basis of the upper limit of the height of a vehicle capable of traveling on a road. The height of a vehicle capable of traveling on a road is defined by traffic rules and the like. For example, according to the Road Traffic Law in Japan, the height of a truck is basically 3.8 m or less. The second height may be, for example, 4 m. If the second height is set to be greater than or equal to 4 m, an object that need not be detected, such as a structure in the air including a traffic light, an information board, and the like, may be detected.

By removing an unnecessary disparity, the unnecessary disparity removal unit 27 can remove disparities of subjects other than the road surface 41 and objects on the road in advance prior to the subsequent object detection process (third process and fourth process) for detecting an object. This increases the accuracy of detection of an object. In addition, since unnecessary disparities are removed, the amount of arithmetic processing related to disparities independent of objects on the road can be reduced, and the processing speed can be increased. Thus, the object detection device 20 of the present disclosure can improve the performance of the object detection process.

The unnecessary disparity removal unit 27 passes the second disparity image to the clustering unit 28. The clustering unit 28 performs, based on the second disparity image and the approximate expression of the position of the road surface 41 calculated by the road surface detection unit 26, a process (third process) for determining an object disparity related to an object for at each u coordinate or a range of the u coordinate in the transverse direction (step S104). Specifically, the clustering unit 28 generates, for each range of the u coordinate in the transverse direction of the second disparity image, a histogram representing the numbers of pixels corresponding to respective disparities. The range of the u coordinate is a range including one or more pixels in the transverse direction.

Figure 20:
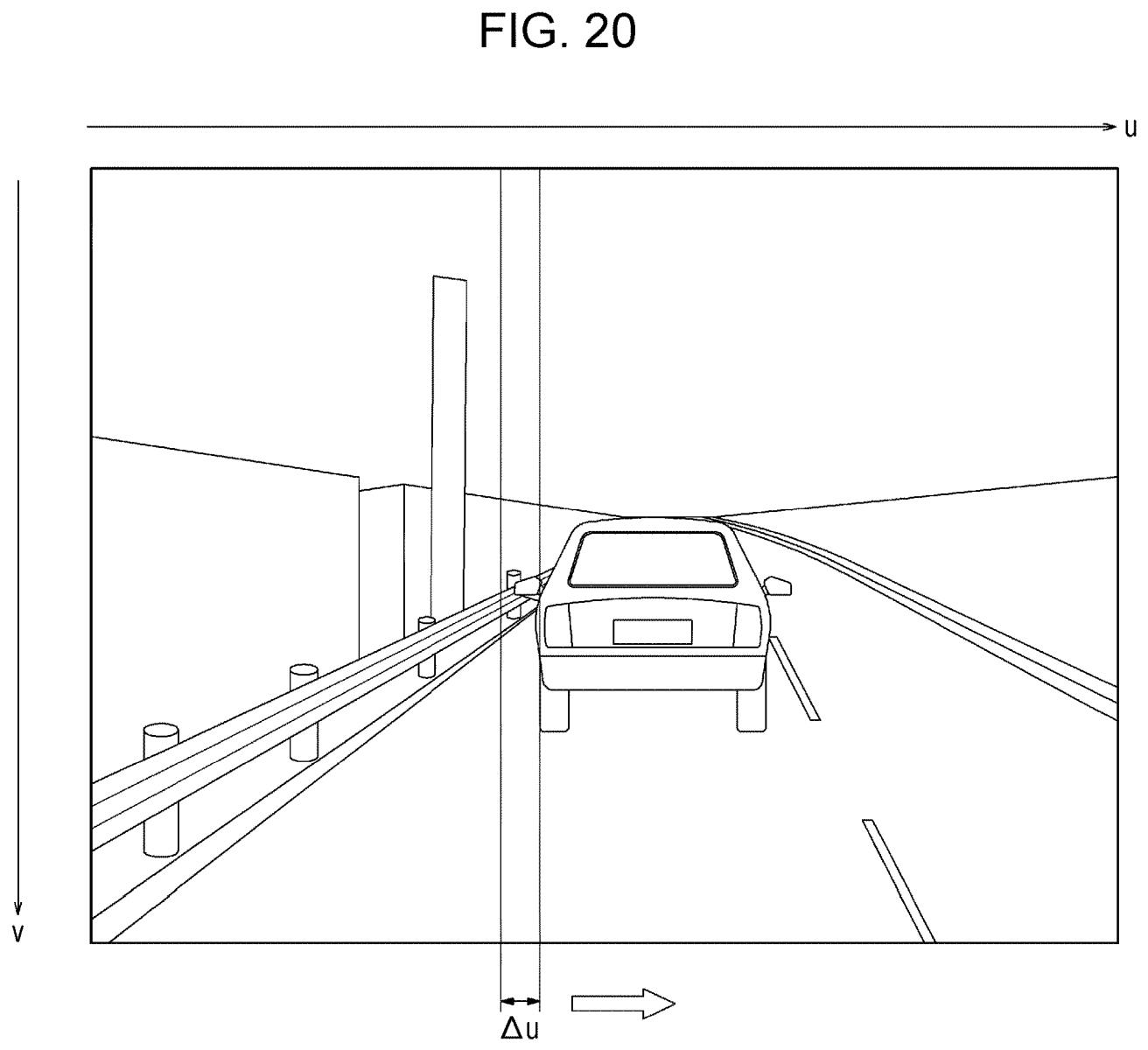

As illustrated in FIG. 20, the clustering unit 28 extracts, from the second disparity image, a vertically long region having a width Au of one or more pixels in the transverse direction. The vertically long region is used for determining whether an object disparity related to an object is present in this region and for acquiring distance information corresponding to the object disparity. Thus, reducing the transverse width Au of the vertically long region increases the resolution of detection of an object in the transverse direction. In FIG. 20, the width Au is displayed to be large for explanation. However, Au can be a width of one pixel to several pixels. Vertically long regions are sequentially acquired from one end to the other end of the second disparity image in the transverse direction, and the process described below is performed to detect an object disparity over the entire second disparity image in the transverse direction.

Figure 21:
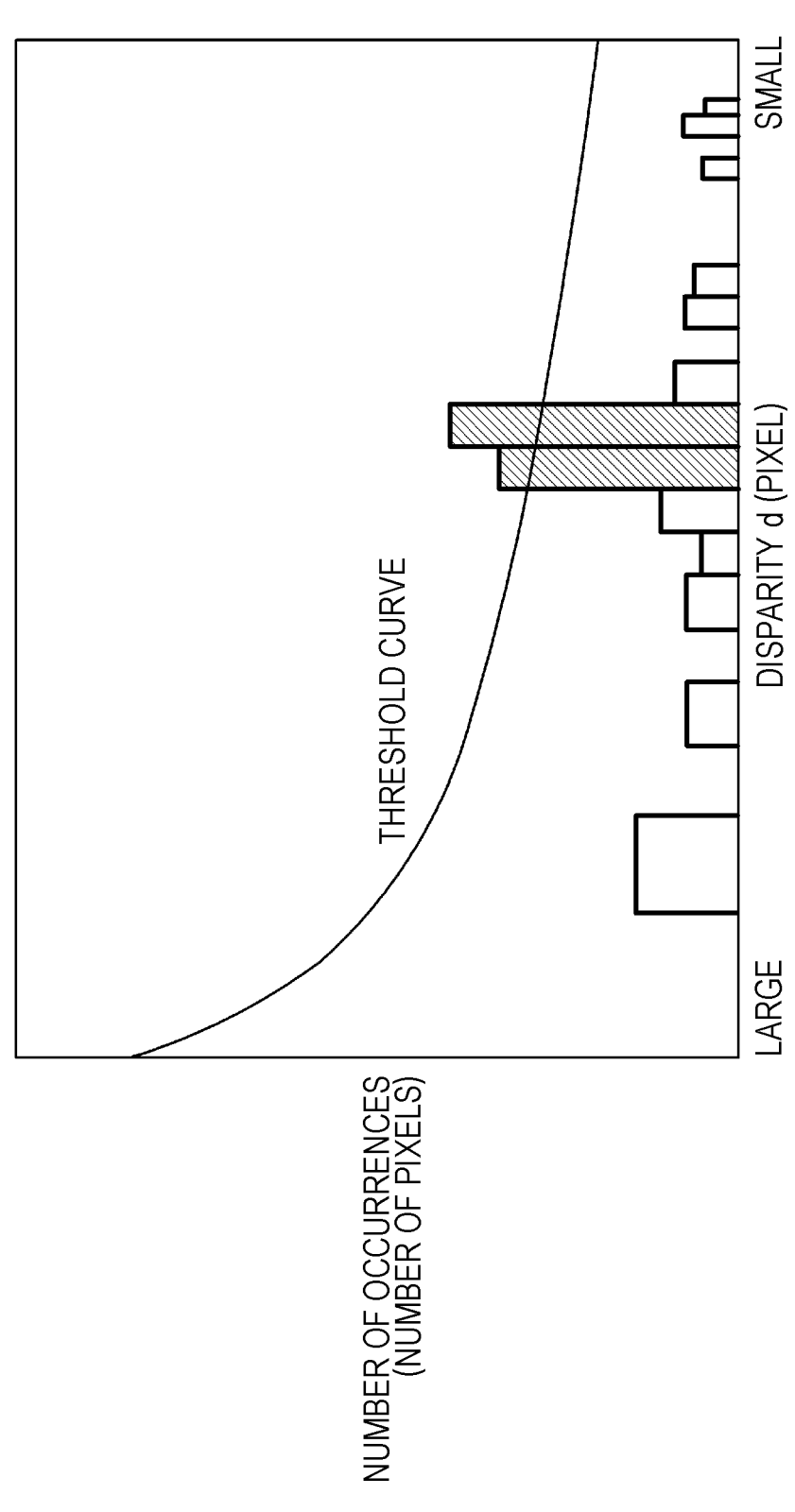
FIG. 21 is a diagram describing an object disparity discrimination method based on a histogram.

FIG. 21 is a diagram illustrating an example of the histogram. In FIG. 21, the horizontal axis represents the disparity d expressed in units of pixels. The disparity d is largest at the leftmost position and decreases from left to right along the horizontal axis. The minimum value of the disparity d may be, for example, one pixel or a value smaller than one pixel. The larger the disparity is, the finer the resolution of the distance is, and the smaller the disparity is, the coarser the resolution of the distance is. Thus, more disparities d are combined on the larger-disparity side of the horizontal axis of the histogram in FIG. 21. The vertical axis of the histogram in FIG. 21 represents the number of occurrences of disparity pixels having the disparity d on the horizontal axis.

FIG. 21 further illustrates a threshold curve representing a threshold for determining whether each disparity d is an object disparity. The disparity d can be a representative value of a disparity section having a width. When the number of occurrences of pixels of each disparity d exceeds the threshold curve, this means that a predetermined number or more of disparity pixels representing the same distance, the number being defined by the threshold curve, are included in the vertically long region having the width Au. In FIG. 21, bins (pillar-shaped portions) shaded with oblique lines are above the threshold curve. The threshold curve can be set to the number of occurrences (number of pixels) corresponding to a predetermined height in the y direction in the real space for each disparity d. The predetermined height can be, for example, 50 cm. An object located at a long distance and having a small disparity is displayed smaller in the image than an object at a short distance. Thus, the value of the number of occurrences indicated by the threshold curve on the vertical axis decreases as the disparity d decreases. When the number of occurrences of pixels exceeds a predetermined threshold corresponding to the disparity d, the clustering unit 28 determines the disparity d corresponding to the pixels as an object disparity $d_e$.

Then, the clustering unit 28 calculates height information associated with the object disparity $d_e$ on the basis of the distribution of the object disparity $d_e$ on the second disparity image and the position of the road surface 41 estimated in step S102 (step S105). The processing of step S105 may be included in the third process.

Figure 22:
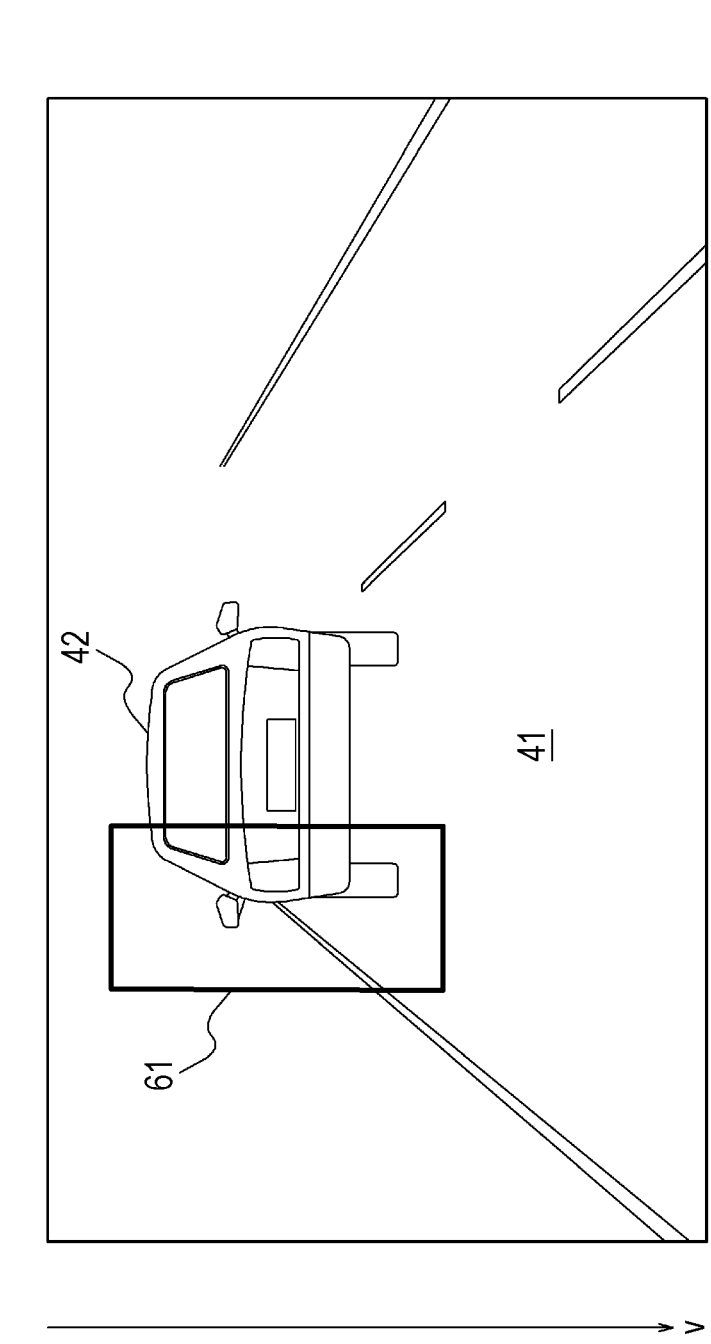
FIG. 22 is a diagram describing a method for acquiring height information of an object disparity.
Figure 23:
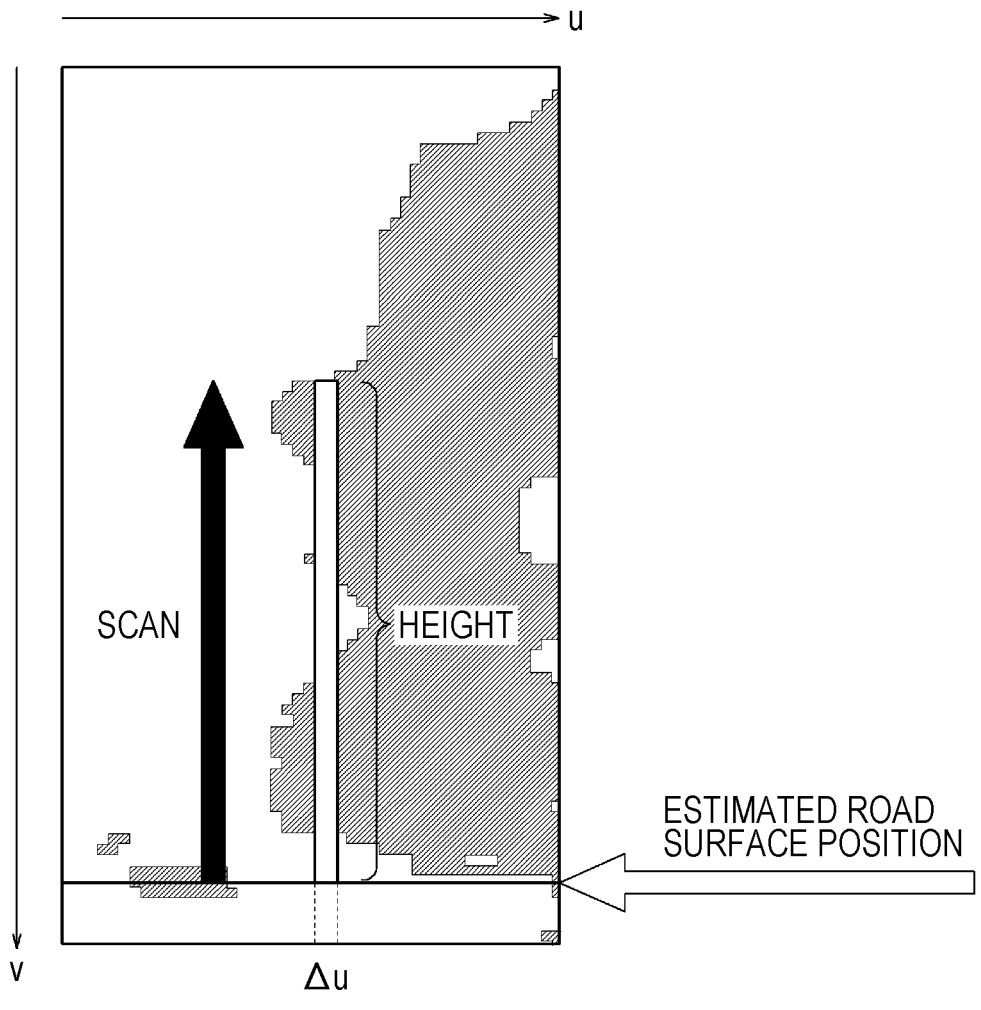
FIG. 23 is a diagram describing a method for acquiring height information of an object disparity.

Specifically, it is assumed that an image acquired by the first camera 11 or the second camera 12 includes a portion as illustrated in FIG. 22. A portion corresponding to a portion of the other vehicle 42 in the second disparity image, which is surrounded by a frame 61, is illustrated in FIG. 23 in an enlarged manner.

The clustering unit 28 calculates, for the u coordinate where the object disparity $d_e$ is present, an estimated road surface position corresponding to the distance to the object represented by the object disparity $d_e$ on the basis of distance information of the object disparity $d_e$ and the road surface position estimated in step S102. When an object is present on the road surface 41, disparity pixels having an object disparity $d_e$ are arranged above the estimated road surface position in the second disparity image. The clustering unit 28 scans the disparity pixels on the second disparity image in the upward direction from the road surface position of the u coordinate, and detects a distribution of the disparity pixels having the object disparity $d_e$ in the longitudinal direction (v coordinate direction). The clustering unit 28 determines height information on the second disparity image on the basis of the number or distribution of arranged disparity pixels having the same object disparity $d_e$. The clustering unit 28 can determine the height information in accordance with predetermined standards for determination even when the disparity pixels having the object disparity $d_e$ are partially disconnected in the longitudinal direction.

The clustering unit 28 can store the object disparity $d_e$ and the height information in the memory 23 in association with each other for each range of the coordinate in the transverse direction (u coordinate) including one or more coordinates. As an example illustrated in FIG. 24, the clustering unit 28 can represent the plurality of object disparities $d_e$ stored in the memory 23 as a distribution of points lying in a two-dimensional space (u-d coordinate space) with the horizontal axis and the vertical axis representing the u coordinate and the disparity d, respectively. The clustering unit 28 passes information on the object disparity $d_e$ for each u coordinate to the grouping unit 29.

The grouping unit 29 executes a process (fourth process) for detecting an object by converting the information on the object disparities $d_e$ in the u-d coordinate space into points in the x-z coordinate space (real space) of the world coordinate system and by extracting a group (collection) of points (step S106). The grouping unit 29 groups a plurality of points that are close to each other in accordance with a predetermined condition and extracts the points as a group of points. An example of a process executed by the grouping unit 29 will be described with reference to FIG. 25 to FIG. 32.

Figure 25:
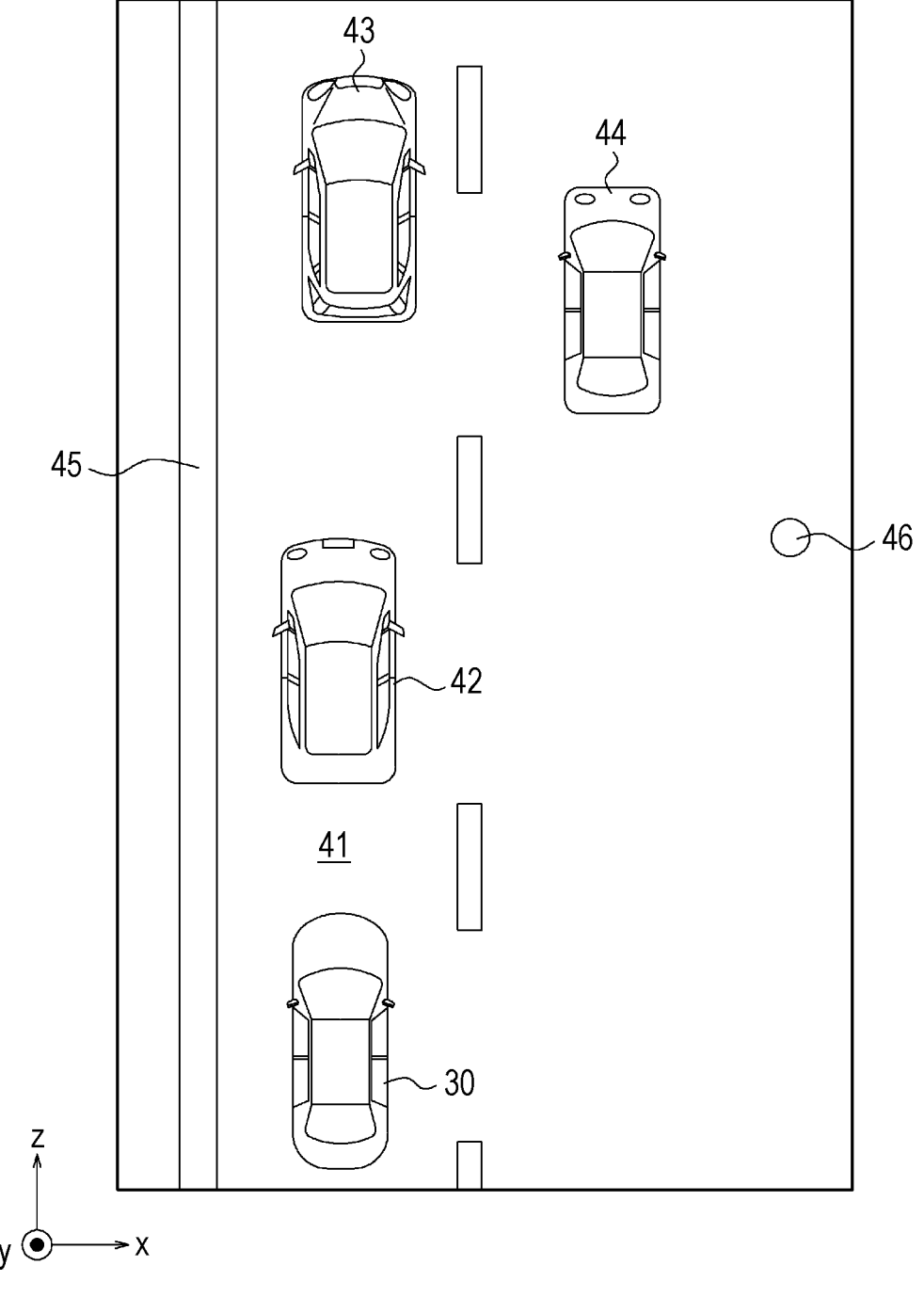
FIG. 25 is a view of the road surface as viewed from a height direction (y direction).

FIG. 25 includes the mobile object 30 traveling on the road surface 41 of the road and having mounted therein the object detection system 1, other vehicles 42, 43, and 44, a side wall 45, and a road lighting fixture 46. In FIG. 25, the mobile object 30 is a vehicle.

Figure 24:
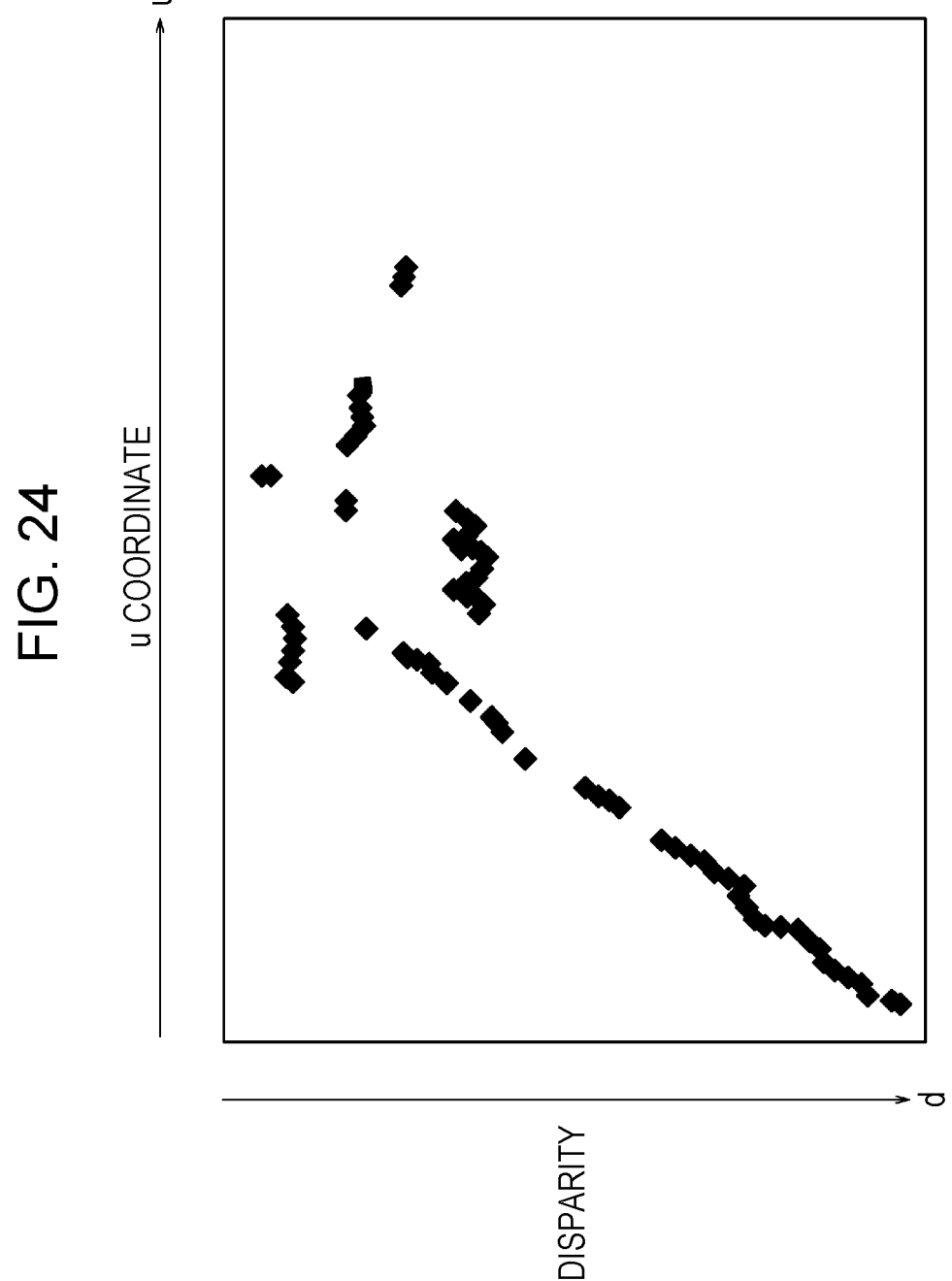
FIG. 24 is a diagram illustrating an example of a distribution, in a u-d space, of points indicating object disparities.
Figure 26:
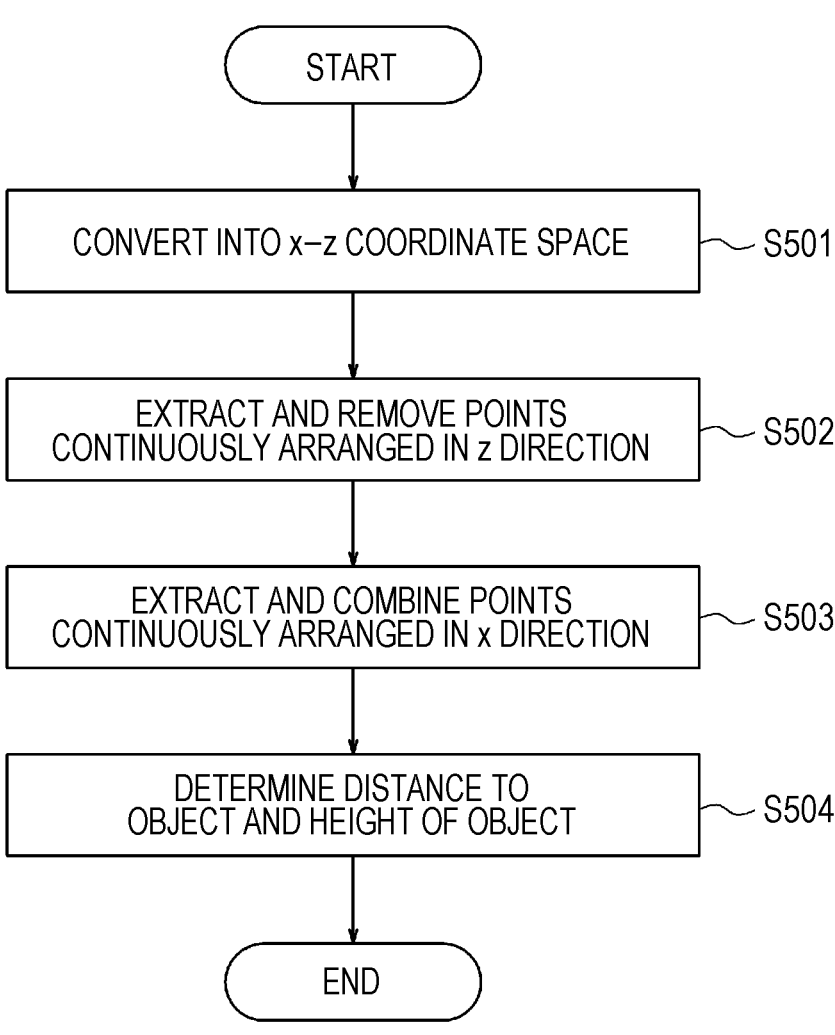
FIG. 26 is a flowchart illustrating an example of a process for detecting an object.
Figure 27:
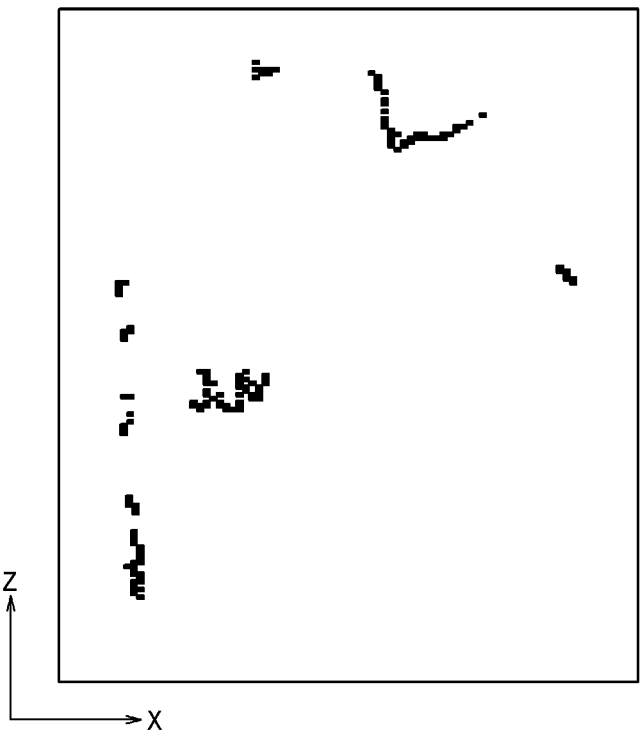
FIG. 27 is a diagram of points lying on an x-z plane in a real space into which object disparities are converted.

FIG. 26 is a flowchart illustrating the operation of the grouping unit 29. In step S501, the grouping unit 29 of the object detection device 20 mounted in the mobile object 30 converts the plurality of object disparities $d_e$ in the u-d coordinate space as illustrated in FIG. 24 into points in the real space (x-z coordinate space) as illustrated in FIG. 27. In FIG. 27, each point on the x-z coordinate space indicates the presence or absence of an object. That is, the presence of a point means the presence of an object, and the absence of a point means the absence of an object. FIG. 27 corresponds to FIG. 25 and illustrates the other vehicles 42, 43, and 44, the side wall 45, and the road lighting fixture 46 as sets of points. The grouping unit 29 stores, for each point, information on the object disparity $d_e$ and information on the height, which are determined by the clustering unit 28, in association with each other. In the world coordinate system, the x direction is a direction perpendicular to the direction of travel of the mobile object 30. In the world coordinate system, the z direction is a direction horizontal to the direction of travel of the mobile object 30.

Figure 28:
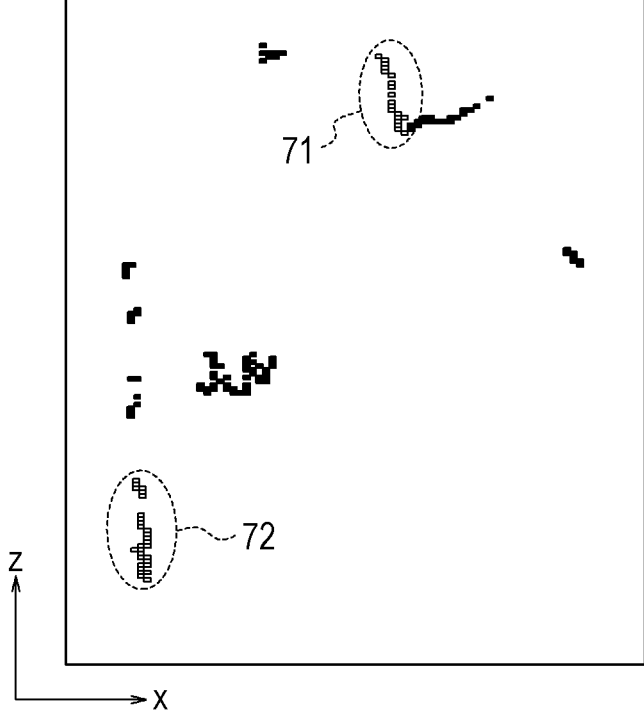
FIG. 28 is a diagram illustrating an example of points continuously arranged in the z direction, which are extracted from among the points on the x-z plane.
Figure 29:
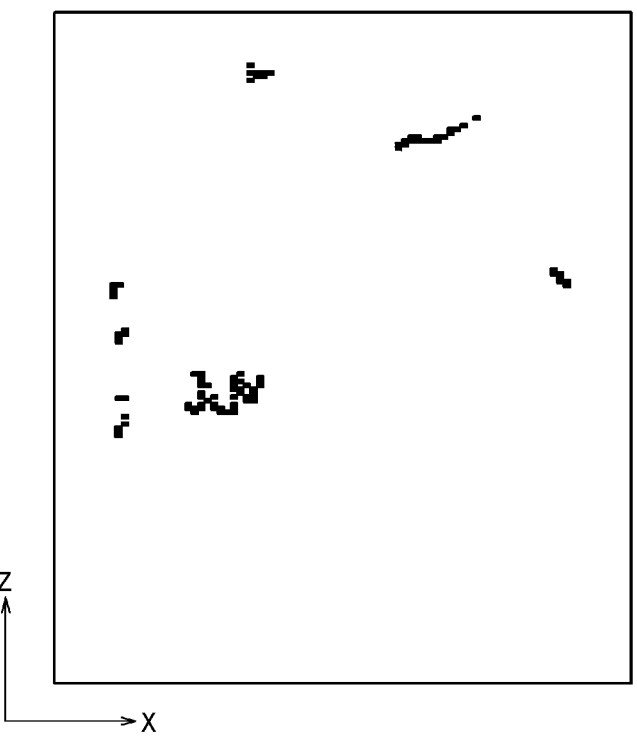
FIG. 29 is a diagram illustrating an example of points on the x-z plane after the points continuously arranged in the z direction are deleted.

In step S502, the grouping unit 29 extracts points continuously arranged in the z direction from among the points on the x-z coordinate space. For example, when a predetermined number or more of points (with a predetermined length or more in the real space) are continuous in the z direction, the grouping unit 29 extracts the points. Then, the grouping unit 29 deletes the extracted points from the points on the x-z coordinate space. FIG. 28 illustrates an example of a set of points 71 and a set of points 72 extracted by the grouping unit 29, which are continuously arranged in the z direction. FIG. 29 illustrates an example of points on the x-z coordinate space after the grouping unit 29 deletes the set of points 71 and the set of points 72, which are continuously arranged in the z direction, from the x-z coordinate space.

A set of points continuously arranged in the z direction indicates the presence of an object estimated to be parallel to the direction of travel of the mobile object 30. Objects parallel to the direction of travel of the mobile object 30 include structures alongside the road, such as a guardrail and a side wall, and a side surface of the body of another vehicle. The set of points 71 in FIG. 28 indicates a side surface of the body of the other vehicle 44 in FIG. 25. The set of points 72 in FIG. 28 indicates a portion of the side wall 45 in FIG. 25. The grouping unit 29 performs the processing of step S502, thereby being able to reduce the rate of detection of an object parallel to the direction of travel.

Figure 30:
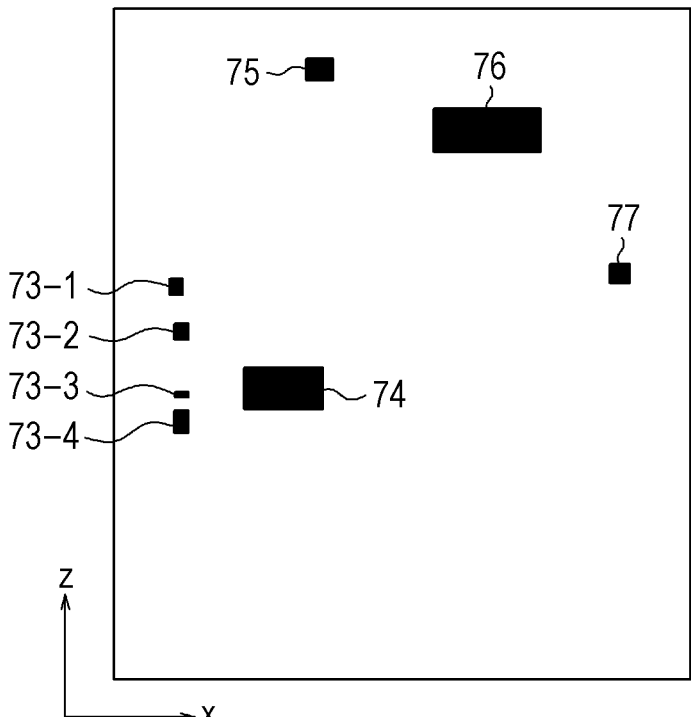
FIG. 30 is a diagram illustrating an example of a combined region generated from the points on the x-z plane.

In step S503, the grouping unit 29 extracts points continuously arranged in the x direction from among the points on the x-z coordinate space, and combines the points together. For example, when a predetermined number or more of points (with a predetermined length or more in the real space) are continuous in the x direction, the grouping unit 29 extracts points that are continuous in the x direction. Then, the grouping unit 29 combines the points that are continuous in the x direction together in the z direction and determines a quadrangular region (combined region) including a group of points. FIG. 30 illustrates an example of the combined region determined by the grouping unit 29. If the width of the combined region in the x direction exceeds a threshold, the grouping unit 29 may divide the combined region.

The combined region indicates the presence of an object estimated to be perpendicular to the direction of travel of the mobile object 30. Objects perpendicular to the direction of travel of the mobile object 30 include structures on the road, such as a road lighting fixture, and a rear surface of the body of another vehicle. In FIG. 30, combined regions 73-1 to 73-4 indicate a portion of the side wall 45 in FIG. 25. In FIG. 30, a combined region 74 indicates the rear surface of the body of the other vehicle 42 in FIG. 25. In FIG. 30, a combined region 75 indicates the rear surface of the body of the other vehicle 43 in FIG. 25. The combined region 75 indicates only a portion of the rear surface of the body of the other vehicle 43 that is not hidden by the other vehicle 42 when viewed from the mobile object 30. In FIG. 30, a combined region 76 indicates the rear surface of the body of the other vehicle 44 in FIG. 25. In FIG. 30, a combined region 77 indicates the road lighting fixture 46 in FIG. 25. In this way, the grouping unit 29 can detect an object through the processing of steps S501 to S503.

Figure 31A:
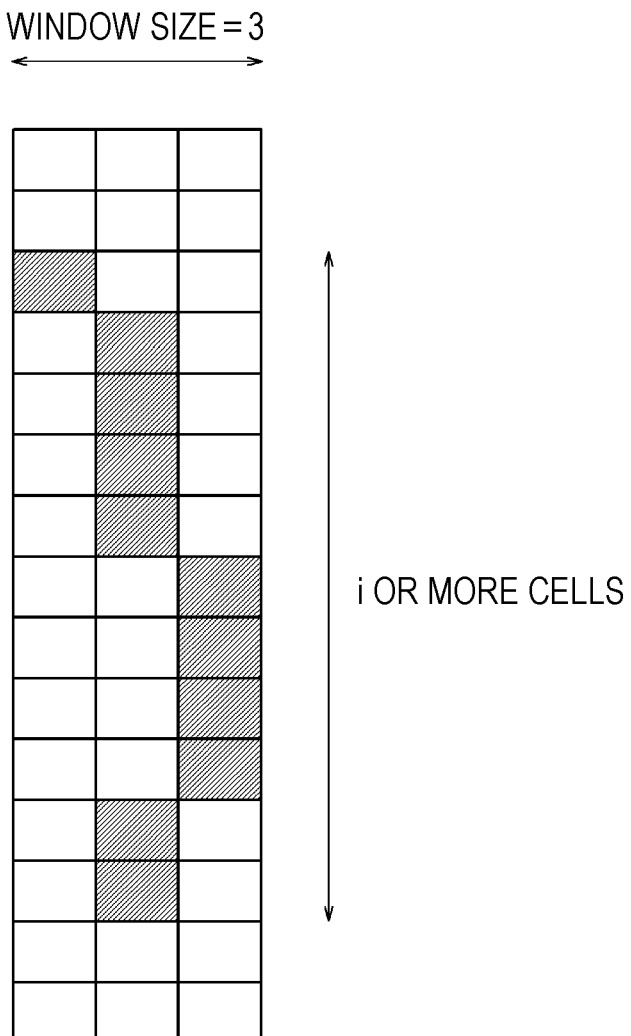
FIG. 31A is a diagram describing a first example of extraction of points continuously arranged in the z direction.
Figure 31B:
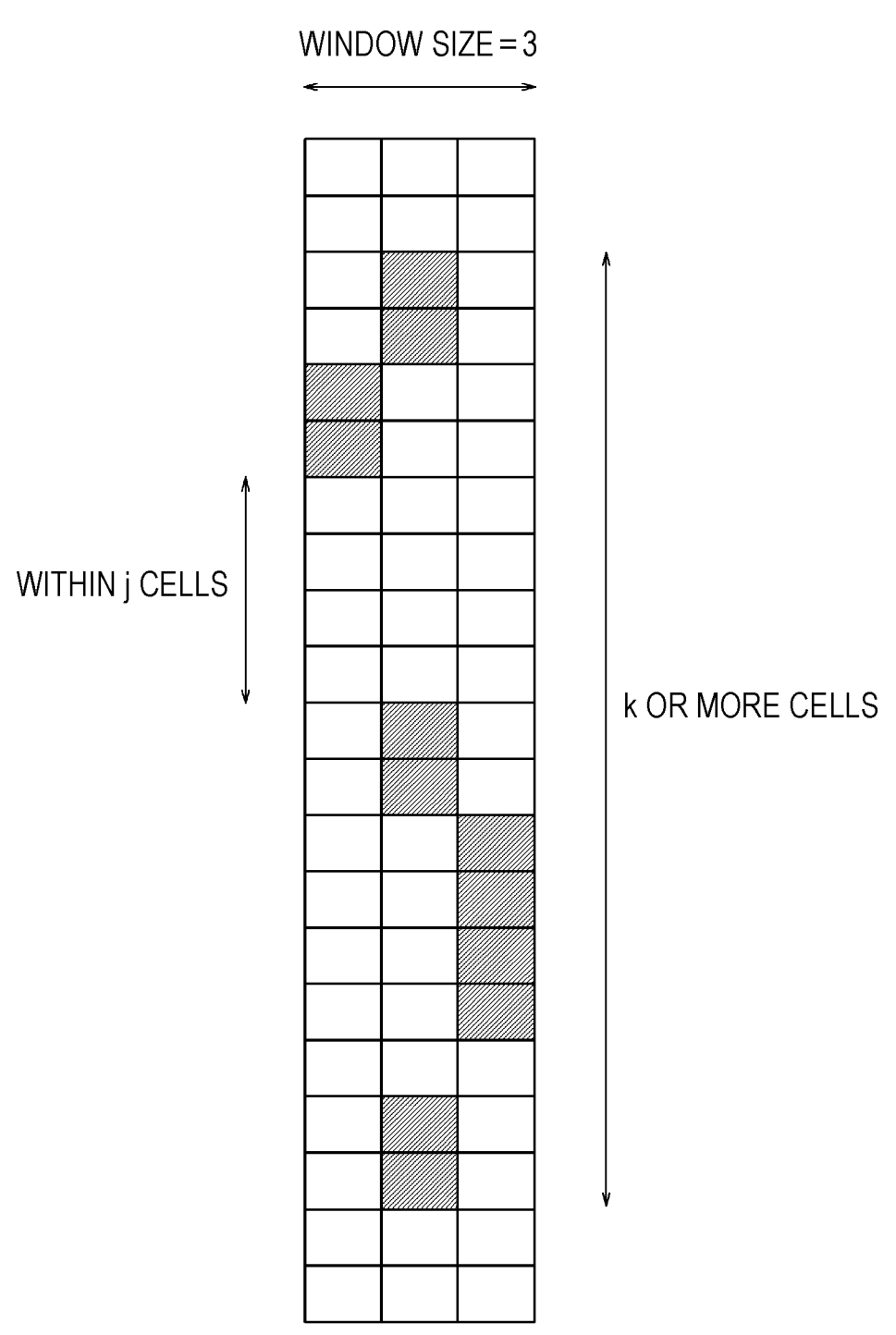
FIG. 31B is a diagram describing a second example of extraction of points continuously arranged in the z direction.

The extraction of points continuously arranged in the z direction and the extraction of points continuously arranged in the x direction can be performed by any method. An example of the extraction of points continuously arranged in the z direction will be described with reference to FIG. 31A and FIG. 31B. In the figures, each cell is the unit of quantization of the x-z coordinate space. Here, the window size in the x direction is set to three cells. The grouping unit 29 starts counting upon the presence of a point in the window size. For example, as illustrated in FIG. 31A, when points are continuously present in i or more cells, the grouping unit 29 determines that the points are points continuously arranged in the z direction. As illustrated in FIG. 31B, even upon the presence of a window in which no point is present after the start of counting, the grouping unit 29 may regard points as being continuous if the window in which no point is present is continuous in the z direction and is within j cells. In this case, for example, when points are regarded as being continuous in k or more continuous cells in the z direction, the grouping unit 29 determines that the points are points continuously arranged in the z direction.

In step S504, the grouping unit 29 determines, based on the object disparity $d_e$ associated with each point on the x-z coordinate space, the distance from the stereo camera 10 mounted in the mobile object 30 to an object perpendicular to the direction of travel of the mobile object 30 (the object detected in the processing of steps S501 to S503). For example, the grouping unit 29 calculates an average value of distances from the stereo camera 10 to respective ones of the longest continuous points in the x direction within a group of points included in the combined region, as the distance to an object perpendicular to the direction of travel of the mobile object 30.

In step S504, furthermore, the grouping unit 29 determines, based on the height information associated with each point on the x-z coordinate space, the height of the object perpendicular to the direction of travel of the mobile object 30. A point having a high height indicated by the height information among the points on the x-z coordinate space may indicate an aerial object or the like or may be noise. Accordingly, the grouping unit 29 may be configured not to use a point having a high height indicated by the height information among the points on the x-z coordinate space for the determination of the height of an object. For example, the grouping unit 29 may sort the heights of the points in a group of points included in the combined region in order of height, and set a predetermined height as the height of the object perpendicular to the direction of travel of the mobile object 30. As a result, the grouping unit 29 can determine the height of an object excluding an object such as an aerial object higher than the mobile object 30. In addition, the height of an object can be accurately determined with less susceptibility to noise.

Further, the grouping unit 29 may determine the breadth of an object on the basis of a distribution of groups of points in the x direction. That is, the grouping unit 29 may determine the breadth of an object on the basis of the width of the combined region in the x direction. Thus, the grouping unit 29 can recognize the position, breadth, and height of the recognized object in the x-z coordinate space.

Figure 32:
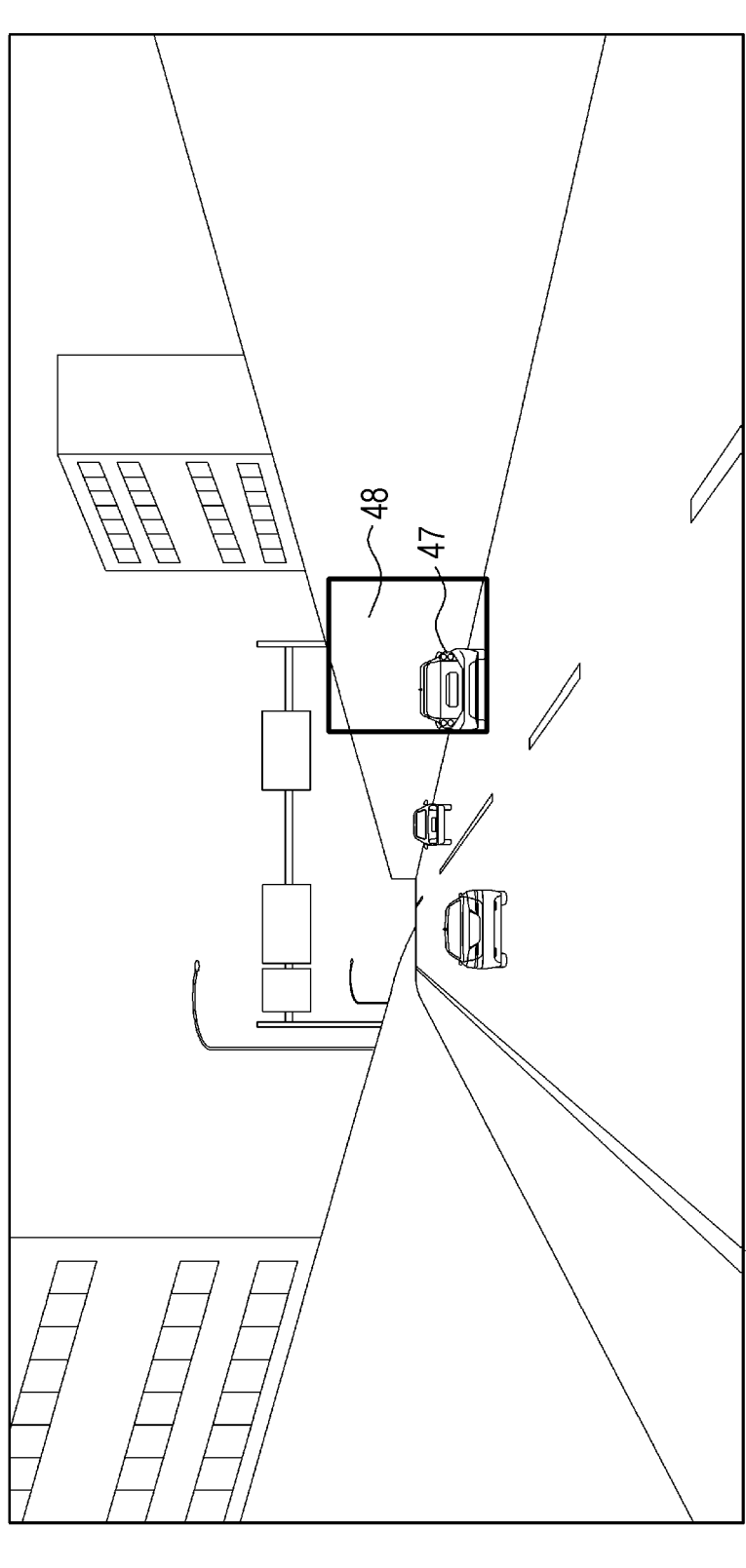
FIG. 32 is a diagram illustrating an example of other vehicles traveling on an expressway.

The object indicated by the combined region determined in step S503 may include a mobile object and a stationary object such as a side wall taller than the mobile object. For example, as illustrated in FIG. 32, when another vehicle 47 is traveling on an expressway, both the other vehicle 47 and a soundproof wall 48 of the expressway may be indicated as a single combined region. When a single combined region indicates both the other vehicle 47 and the soundproof wall 48 of the expressway, as a result of comparison of heights corresponding to both ends of the combined region in the x-z coordinate space in the x direction, one is the height of the other vehicle 47, and the other is the height of the soundproof wall 48. Accordingly, in step S504, the grouping unit 29 calculates an average value of heights associated with points included in a portion corresponding to a predetermined proportion (for example, 30%) of the combined region from each end thereof in the x direction, and, when the difference between the average values of the heights of both ends exceeds a threshold (for example, several meters), determine the value of the lower height as the height of the object. That is, when the difference between the heights of both ends of the detected object exceeds a threshold, the grouping unit 29 may determine the lower height as the height of the object. As a result, the grouping unit 29 can determine the height of a mobile object even if the mobile object and a stationary object taller than the mobile object are collectively detected as a single object.

Figure 33:
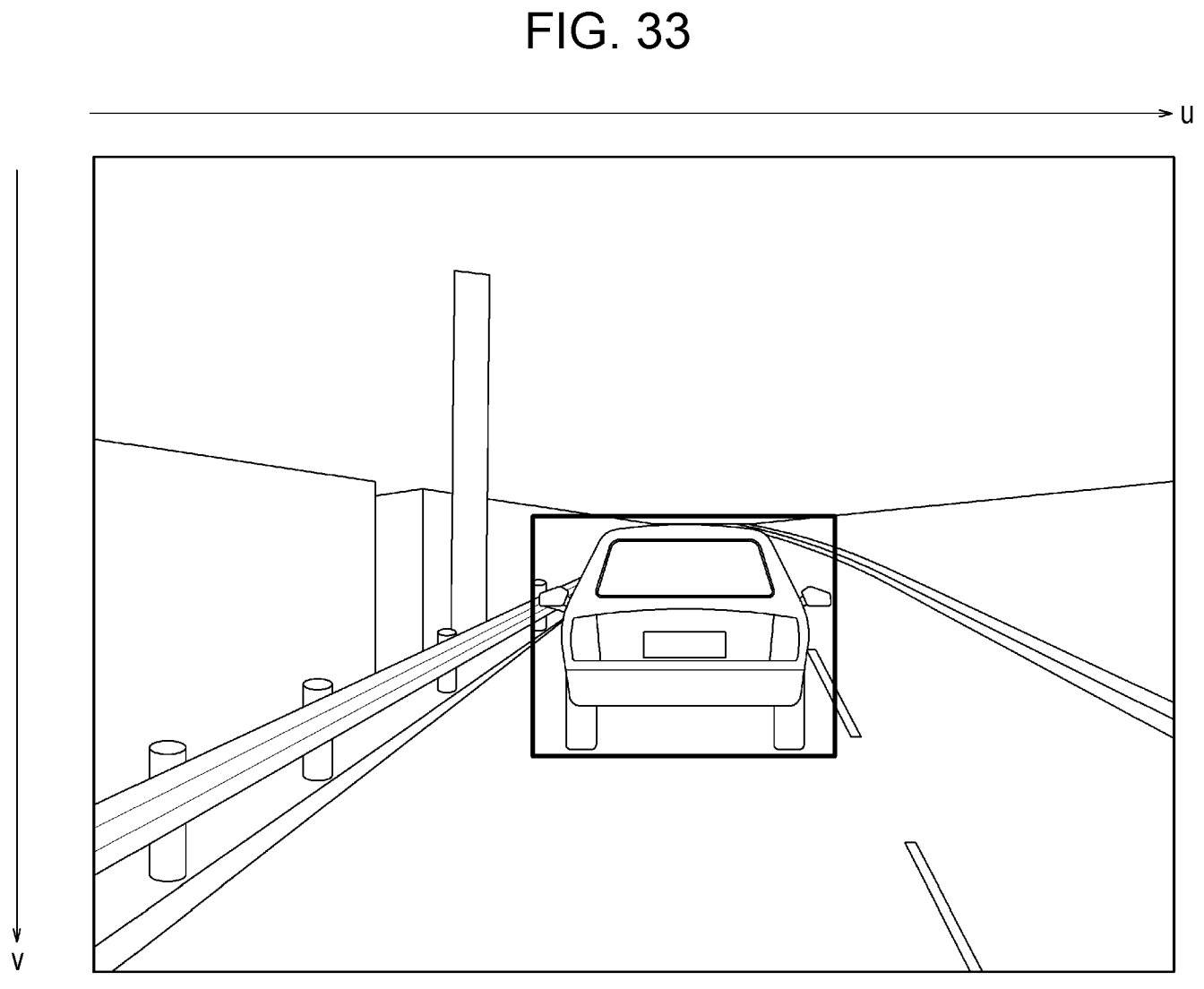

The image processing unit 22 can output information on the position, breadth, and height of the object recognized by the grouping unit 29 to other devices inside the mobile object 30 through the output unit 24 (step S107). For example, the image processing unit 22 can output the information described above to a display device in the mobile object 30. As illustrated in FIG. 33, the display device in the mobile object 30 may display a frame surrounding an image of the other vehicle 42 in the image of the first camera 11 or the second camera 12, on the basis of the information acquired from the object detection device 20. In FIG. 33, the frame indicates the position of the detected object and a range occupied by the object in the image.

As described above, the object detection device 20 of the present disclosure enables object detection at a high processing speed with high accuracy. That is, the object detection device 20 of the present disclosure can improve the object detection performance. Further, the object to be detected by the object detection device 20 is not limited to a specific type of object. The object detection device 20 is capable of detecting any object present on a road surface. The image processing unit 22 of the object detection device 20 can execute the first process, the second process, the third process, and the fourth process without using information on an image captured by the stereo camera 10 other than the first disparity image. This may eliminate the need for the object detection device 20 to perform a process of separately recognizing an object from a captured image in addition to processing of the first disparity image and the second disparity image. Accordingly, the object detection device 20 of the present disclosure can reduce the processing load of object recognition on the image processing unit 22. This does not preclude the object detection device 20 of the present disclosure from being combined with image processing for an image obtained directly from the first camera 11 or the second camera 12. The object detection device 20 can be combined with an image processing technique such as template matching.

In the description of the processes executed by the image processing unit 22 described above, processes including determination, operation, and the like using various images have been described to help understand the present disclosure. The processes using these images need not include processes for actually drawing an image. Processes having substantially the same content as the processes using these images are executed by information processing inside the image processing unit 22.

While embodiments according to the present disclosure have been described with reference to the drawings and examples, it should be noted that various modifications or changes can easily be made by a person skilled in the art on the basis of the present disclosure. Accordingly, it should be noted that these modifications or changes fall within the scope of the present disclosure. For example, the functions and the like included in each component, each step, or the like can be rearranged in any manner that is not logically contradictory, and a plurality of components, steps, or the like may be combined into one or divided. While embodiments according to the present disclosure have been described focusing on a device, embodiments according to the present disclosure may also be implemented as a method including steps executed by the components of the device. Embodiments according to the present disclosure may also be implemented as a method or a program executed by a processor included in the device, or a storage medium having recorded therein the program. It should be understood that these are also included in the scope of the present disclosure.

In the present disclosure, descriptions such as "first" and "second" are identifiers for distinguishing the respective configurations. The configurations distinguished by the descriptions such as "first" and "second" in the present disclosure may be interchangeably numbered. For example, a first lens and a second lens can exchange their identifiers "first" and "second". The identifiers are exchanged simultaneously. Even after the identifiers are exchanged, the respective configurations are distinguishable. The identifiers may be deleted. Configurations without identifiers are distinguished using reference signs. Only the description of identifiers such as "first" and "second" in the present disclosure should not be used for interpreting the order of the configurations or as a basis of the presence of identifiers with smaller numbers.

In the present disclosure, the x direction, the y direction, and the z direction are provided for convenience of description and may be interchanged with each other. The configurations according to the present disclosure have been described using the Cartesian coordinate system with the x direction, the y direction, and the z direction corresponding to the respective axial directions. The positional relationship between the components according to the present disclosure is not limited to an orthogonal relationship. The u coordinate and the v coordinate representing coordinates on an image are provided for convenience of description and may be interchanged with each other. The origins and directions of the u coordinate and the v coordinate are not limited to those of the present disclosure.

In the embodiment described above, the first camera 11 and the second camera 12 of the stereo camera 10 are positioned side by side in the x direction. The arrangement of the first camera 11 and the second camera 12 is not limited to this. The first camera 11 and the second camera 12 may be positioned side by side in a direction perpendicular to the road surface (i.e., the y direction) or a direction inclined with respect to the road surface 41. The number of cameras included in the stereo camera 10 is not limited to two. The stereo camera 10 may include three or more cameras. For example, two cameras arranged side by side in a direction horizontal to the road surface and two cameras arranged side by side in a direction perpendicular to the road surface, namely, four cameras in total, may be used to obtain more accurate distance information.

In the embodiment described above, the stereo camera 10 and the object detection device 20 are mounted in the mobile object 30. The stereo camera 10 and the object detection device 20 may not necessarily be mounted in the mobile object 30. For example, the stereo camera 10 and the object detection device 20 may be mounted in a roadside device installed at an intersection or the like and disposed so as to capture an image including a road surface. For example, the roadside device is capable of detecting a first vehicle approaching from one of roads intersecting at an intersection and providing information indicating that the approach of the first vehicle to a second vehicle traveling and approaching from the other road.

REFERENCE SIGNS LIST 1 object detection system
10 stereo camera
11 first camera
12 second camera
20 object detection device
21 acquisition unit
22 image processing unit (processor)
23 memory
24 output unit
25 disparity image generation unit
26 road surface detection unit
27 unnecessary disparity removal unit 28 clustering unit
29 grouping unit
30 mobile object
41 road surface
42, 43, 44, 47 other vehicle (object)
45 side wall
46 road lighting fixture
48 soundproof wall
50, 61 frame
51 graph
52 first straight line
53 approximation start point
54 candidate straight line
55 second straight line
71, 72 set of points
73-1, 73-2, 73-3, 73-4, 74, 75, 76, 77 combined region
$R_1$ first portion
$R_2$ second portion
The invention claimed is:

1. An object detection device comprising:
a processor configured to execute
a road surface detection process for estimating a position of a road surface in a real space based on a first disparity map, the first disparity map being generated based on an output of a stereo camera that captures an image including the road surface and being a map in which a disparity obtained from the output of the stereo camera is associated with two-dimensional coordinates formed by a first direction corresponding to a horizontal direction of the image and a second direction intersecting the first direction, wherein the stereo camera is composed of two cameras, and wherein a magnitude of the disparity corresponds to a distance between a subject whose image is captured by the stereo camera and the stereo camera in the real space,
an object disparity determination process for determining disparities as object disparities when a number of occurrences of each of the disparities for respective coordinate ranges in the first direction of the first disparity map exceeds a predetermined threshold that decreases as the disparity decreases, and
an object detection process for detecting an object by converting information on the object disparities into points on an x-z coordinate space of a world coordinate system, each of the points indicating presence or absence of the object, and by extracting a group of points,
wherein the object detection process detects the object by extracting a group of points after deleting points that are continuous in a z direction from the points on the x-z coordinate space using a length threshold in the z direction, wherein the z direction is a direction horizontal to a direction of travel of a mobile object on which the stereo camera is mounted.

2. The object detection device according to claim 1, wherein the processor is configured to, in the object detection process, detect the object by extracting a group of points that are continuous in an x direction from the points on the x-z coordinate space.

3. The object detection device according to claim 1, wherein the processor is configured to, in the object detection process, determine a distance from the stereo camera to the object based on the object disparities after detecting the object.

4. The object detection device according to claim 1, wherein the processor is configured to
in the object disparity determination process, calculate height information based on a distribution of the determined object disparities on the first disparity map in the second direction and the estimated position of the road surface, and
in the object detection process, determine a height of the object based on the height information after detecting the object.

5. The object detection device according to claim 4, wherein the processor is configured to, in the object detection process, in response to a difference between heights of both ends of the detected object exceeding a threshold, determine a lower height as the height of the object.

6. The object detection device according to claim 1, wherein the processor is configured to, in the object detection process, determine a width of the object based on a distribution of the group of points in an x direction after detecting the object.

7. The object detection device according to claim 1, wherein
the processor is configured to
further execute an unnecessary disparity removal process for removing from the first disparity map a disparity for which a height from the road surface in the real space corresponds to a predetermined range based on the position of the road surface estimated in the road surface detection process to generate a second disparity map, and
execute the object disparity determination process by using the second disparity map instead of the first disparity map.

8. An object detection system comprising:
a stereo camera that captures a plurality of images having a disparity therebetween, wherein the stereo camera is composed of two cameras, and wherein a magnitude of the disparity corresponds to a distance between a subject whose image is captured by the stereo camera and the stereo camera in a real space, and
an object detection device including at least one processor, wherein
the processor is configured to generate, based on an output of the stereo camera that captures an image including a road surface, a first disparity map in which a disparity obtained from the output of the stereo camera is associated with two-dimensional coordinates formed by a first direction corresponding to a horizontal direction of the image captured by the stereo camera and a second direction intersecting the first direction,
the processor is further configured to execute
a road surface detection process for estimating a position of the road surface in the real space based on the first disparity map,
an object disparity determination process for determining disparities as object disparities when a number of occurrences of each of the disparities for respective coordinate ranges in the first direction of the first disparity map exceeds a predetermined threshold that decreases as the disparity decreases, and
an object detection process for detecting an object by converting information on the object disparities for the respective coordinate ranges in the first direction into points on an x-z coordinate space of a world coordinate system, each of the points indicating presence or absence of the object, and by extracting a group of points, and the object detection process detects the object by extracting a group of points after deleting points that are continuous in a z direction from the points on the x-z coordinate space using a length threshold in the z direction, wherein the z direction is a direction horizontal to a direction of travel of a mobile object on which the stereo camera is mounted.

9. A mobile object comprising the object detection system of claim 8.

10. An object detection method comprising:

executing a road surface detection process for estimating a position of a road surface in a real space based on a first disparity map, the first disparity map being generated based on an output of a stereo camera that captures an image including a road surface and being a map in which a disparity obtained from the output of the stereo camera is associated with two-dimensional coordinates formed by a first direction corresponding to a horizontal direction of the image and a second direction intersecting the first direction, wherein the stereo camera is composed of two cameras, and wherein a magnitude of the disparity corresponds to a distance between a subject whose image is captured by the stereo camera and the stereo camera in the real space;

executing an object disparity determination process for determining disparities as object disparities when a number of occurrences of each of the disparities for respective coordinate ranges in the first direction of the first disparity map exceeds a predetermined threshold that decreases as the disparity decreases; and executing an object detection process for detecting an object by converting information on the object disparities for the respective coordinate ranges in the first direction into points on an x-z coordinate space of a world coordinate system, each of the points indicating presence or absence of the object, and by extracting a group of points, wherein the object detection process detects the object by extracting a group of points after deleting points that are continuous in a z direction from the points on the x-z coordinate space using a length threshold in the z direction, wherein the z direction is a direction horizontal to a direction of travel of a mobile object on which the stereo camera is mounted.

* * * * *